(12) United States Patent
Yang

(10) Patent No.: US 10,976,652 B2
(45) Date of Patent: Apr. 13, 2021

(54) ILLUMINATION SYSTEM AND PROJECTION APPARATUS

(71) Applicant: Coretronic Corporation, Hsin-Chu (TW)

(72) Inventor: De-Sheng Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/421,411

(22) Filed: May 23, 2019

(65) Prior Publication Data
US 2019/0369470 A1 Dec. 5, 2019

(30) Foreign Application Priority Data
May 30, 2018 (CN) .......................... 201810542201.2

(51) Int. Cl.
*G03B 21/20* (2006.01)
*G02B 27/14* (2006.01)

(52) U.S. Cl.
CPC ......... *G03B 21/204* (2013.01); *G02B 27/141* (2013.01); *G03B 21/2013* (2013.01); *G03B 21/2066* (2013.01)

(58) Field of Classification Search
CPC ...... G03B 21/00–64; H04N 9/31–3197; G02B 26/008
See application file for complete search history.

(56) References Cited

U.S. PATENT DOCUMENTS

2013/0176540 A1 7/2013 Wei et al.
2014/0119003 A1 5/2014 Huang
(Continued)

FOREIGN PATENT DOCUMENTS

CN 104914657 9/2015
CN 105204278 12/2015
(Continued)

OTHER PUBLICATIONS

"Search Report of Europe Counterpart Application," dated Oct. 7, 2019, pp. 1-7.
(Continued)

*Primary Examiner* — Michelle M Iacoletti
*Assistant Examiner* — Christopher A Lamb, II
(74) *Attorney, Agent, or Firm* — JCIPRNET

(57) ABSTRACT

An illumination system and a projection apparatus are provided. The illumination system includes an excitation light source, a light combining device, a filter module, and a wavelength conversion module. The light combining device is disposed on a transmission path of an excitation light beam emitted from the excitation light source. The filter module is disposed on a transmission path of the excitation light beam transmitted from the light combining device. The filter module includes a light passing-through area allowing the excitation light beam to pass through and at least one filter area reflecting the excitation light beam. The wavelength conversion module is disposed on a transmission path of the excitation light beam reflected by the at least one filter area. The wavelength conversion module converts the excitation light beam reflected by the at least one filter area into a converted light beam and reflects the converted light beam.

20 Claims, 20 Drawing Sheets

(56) References Cited

U.S. PATENT DOCUMENTS

| | | | |
|---|---|---|---|
| 2015/0316775 A1 | 11/2015 | Hsieh et al. | |
| 2015/0338061 A1 | 11/2015 | Huang | |
| 2016/0041457 A1 | 2/2016 | Oh et al. | |
| 2017/0328540 A1* | 11/2017 | Paul | F21V 9/32 |
| 2019/0004409 A1* | 1/2019 | Nishikawa | G03B 21/2073 |
| 2019/0101813 A1* | 4/2019 | Miyazaki | G03B 21/2066 |

FOREIGN PATENT DOCUMENTS

| | | |
|---|---|---|
| CN | 105278226 | 1/2016 |
| CN | 107193178 | 9/2017 |
| CN | 208547803 | 2/2019 |
| JP | 2014075221 | 4/2014 |
| WO | 2014109333 | 7/2014 |

OTHER PUBLICATIONS

"Office Action of China Counterpart Application", dated Nov. 27, 2020, p. 1-p. 16.

* cited by examiner

ILLUMINATION SYSTEM AND PROJECTION APPARATUS

CROSS-REFERENCE TO RELATED APPLICATION

This application claims the priority benefit of China application serial no. 201810542201.2, filed on May 30, 2018. The entirety of the above-mentioned patent application is hereby incorporated by reference herein and made a part of this specification.

BACKGROUND OF THE INVENTION

Field of the Invention

The invention relates to an optical system and an apparatus applying the same. More particularly, the invention relates to an illumination system and a projection apparatus.

Description of Related Art

Generally, a projection apparatus includes an illumination system, a light valve, and a projection lens. In the illumination system, an excitation light source is adopted most of the time along with a phosphor wheel to generate the required color lights, and a filter wheel is disposed to increase color purity. In the prior art, an excitation light beam emitted by the excitation light source is transmitted to the phosphor wheel through a light combining device. The phosphor wheel includes a wavelength conversion area and a light passing-through area. The wavelength conversion area and the light passing-through area alternately cut into a transmission path of the excitation light beam. The wavelength conversion area converts the excitation light beam into a converted light beam and reflects the converted light beam back to the light combining device. The converted light beam reflected back to the light combining device is then transmitted to the filter wheel through the light combining device. On the other hand, the light passing-through area allows the excitation light beam to pass through. The excitation light beam (e.g., a blue light beam) passing through the light passing-through area is then transmitted back to the light combining device through a plurality of light transmission devices (e.g., mirrors) and is transmitted to the filter wheel through the light combining device. Since the light transmission devices are required to be disposed to transmit the excitation light beam, volume and costs of the illumination system cannot be effectively reduced. In addition, a light valve which is able to support synchronous rotation of the phosphor wheel and the filter wheel is expensive, costs of the projection apparatus cannot be effectively reduced either.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention were acknowledged by a person of ordinary skill in the art.

SUMMARY OF THE INVENTION

The invention provides an illumination system and a projection apparatus, which can save time for processing electric signals, reduce costs and reduce volume.

Other objects and advantages of the invention can be further illustrated by the technical features broadly embodied and described as follows.

In order to achieve one or a portion of or all of the objects or other objects, an embodiment of the invention provides an illumination system including an excitation light source, a light combining device, a filter module, and a wavelength conversion module. The excitation light source is adapted to provide an excitation light beam. The light combining device is disposed on a transmission path of the excitation light beam emitted from the excitation light source. The filter module is disposed on a transmission path of the excitation light beam transmitted from the light combining device. The filter module includes a light passing-through area allowing the excitation light beam to pass through and at least one filter area reflecting the excitation light beam. The wavelength conversion module is disposed on a transmission path of the excitation light beam reflected by the at least one filter area. The wavelength conversion module is adapted to convert the excitation light beam reflected by the at least one filter area into a converted light beam and reflects the converted light beam, and that the converted light beam is transmitted towards the at least one filter area. The excitation light beam passing through the light passing-through area and the converted light beam passing through the at least one filter area form an illumination light beam.

In order to achieve one or a portion of or all of the objects or other objects, an embodiment of the invention provides a projection apparatus including the illumination system, a light valve, and a projection lens. The light valve is disposed on a transmission path of an illumination light beam and is adapted to convert the illumination light beam into an image light beam. The projection lens is disposed on a transmission path of the image light beam.

To sum up, the embodiments of the invention have at least one of the following advantages or effects. In the illumination system and the projection apparatus provided by the embodiments of the invention, the excitation light beam emitted from the excitation light source may be transmitted to the filter module through the light combining device without being transmitted to the wavelength conversion module, and the excitation light beam transmitted to the filter module is outputted from the filter module through the light passing-through area of the filter module. Hence, in the illumination system and the projection apparatus provided by the embodiments of the invention, an opening allowing the excitation light beam to pass through is not required to be formed in the wavelength conversion module, and a plurality of light transmission devices configured for transmitting the excitation light beam passing through the opening back to the light combining device are not required to be additionally disposed either. In addition, the wavelength conversion module is not required to synchronously rotate with the filter module. That is, the light valve supporting synchronous rotation only with the filter module may be selected for the projection apparatus. Therefore, the illumination system and the projection apparatus provided by the invention have advantages of saving time for processing electric signals, reducing costs and reducing volume, etc.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
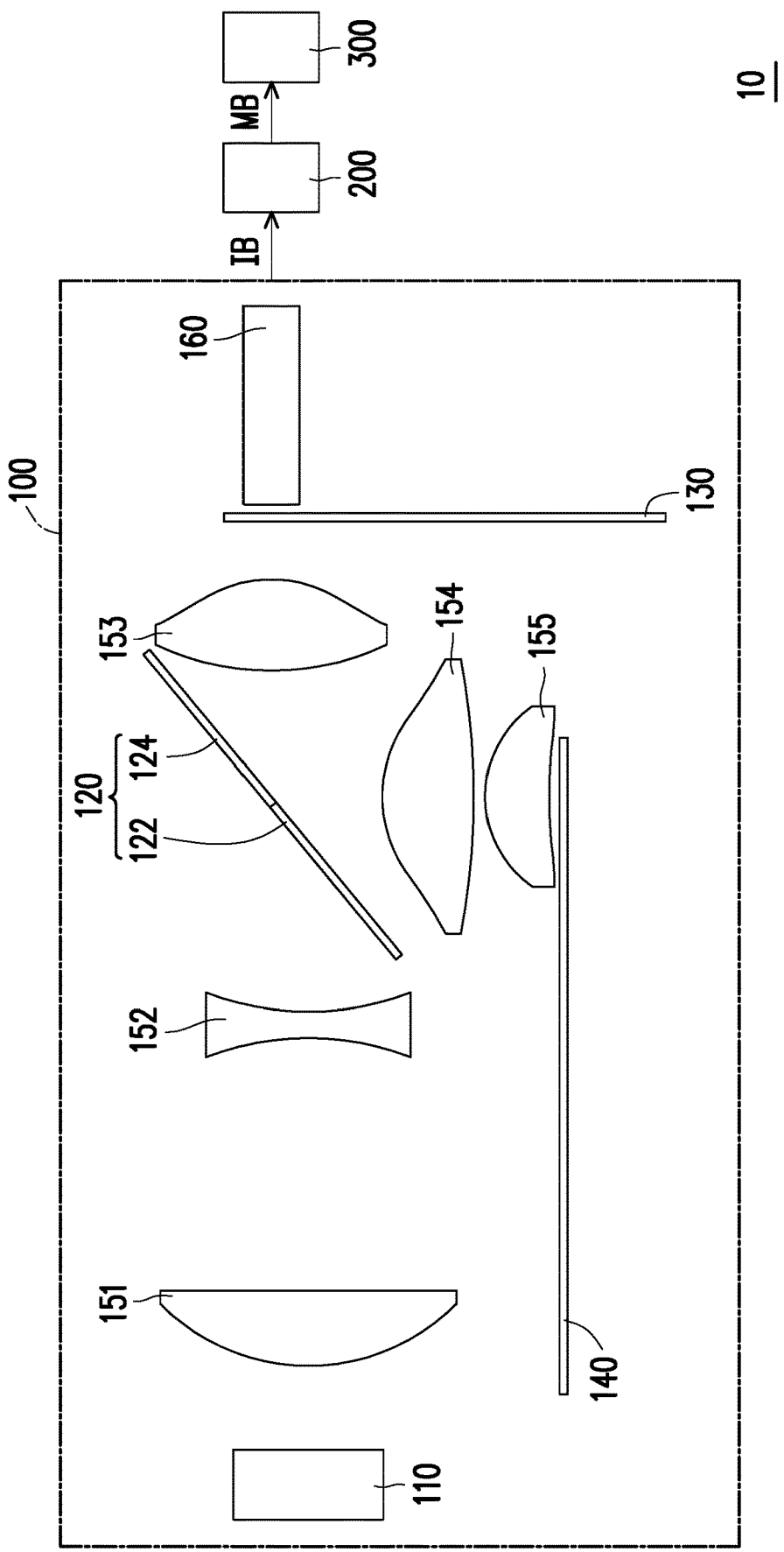
FIG. 1 is a schematic view of a projection apparatus according to an embodiment of the invention.
Figure 2A:
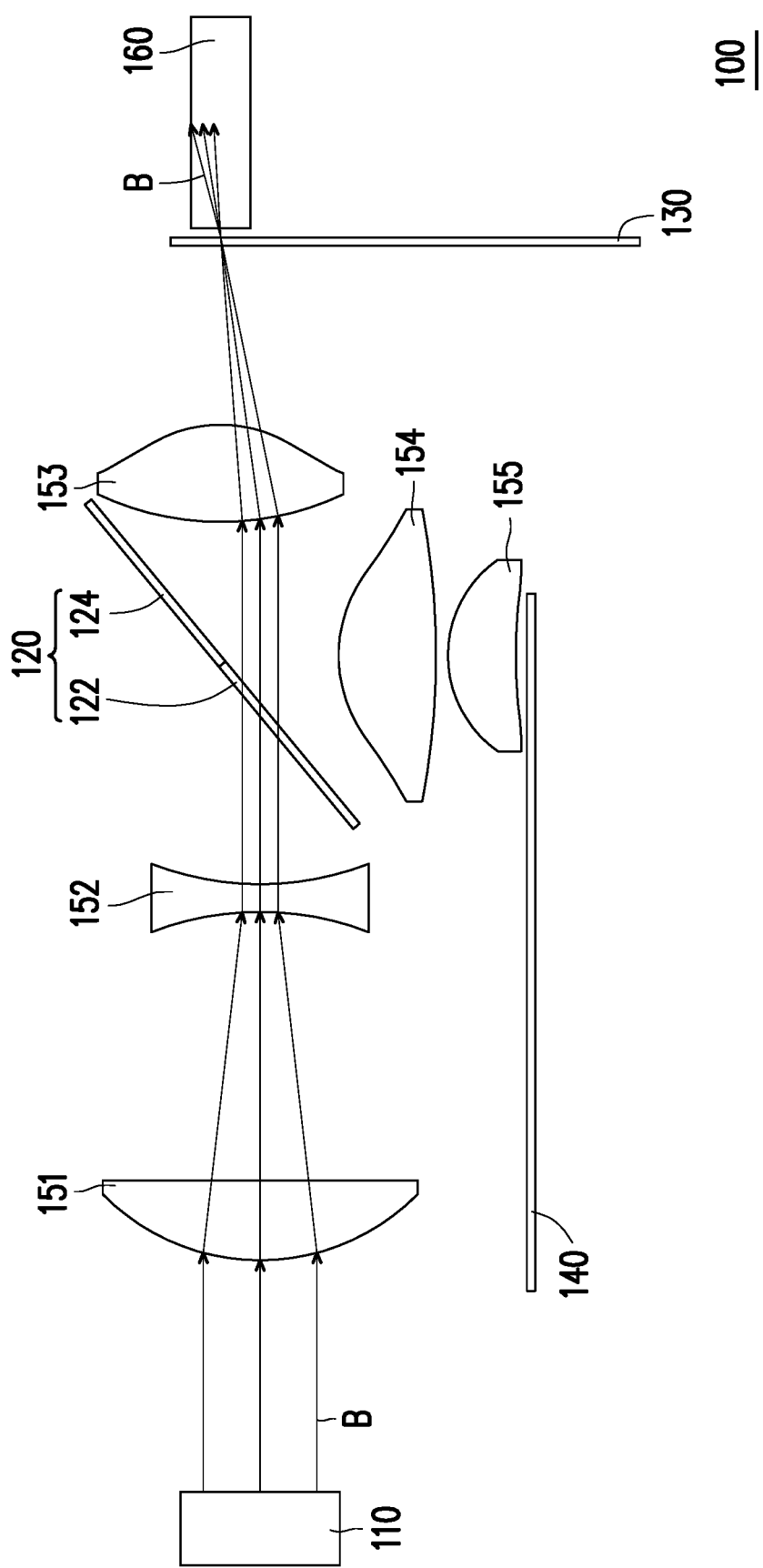
FIG. 2A and FIG. 2B are diagrams of two optical paths of an illumination system of a first embodiment of the invention in different time periods.
Figure 2B:
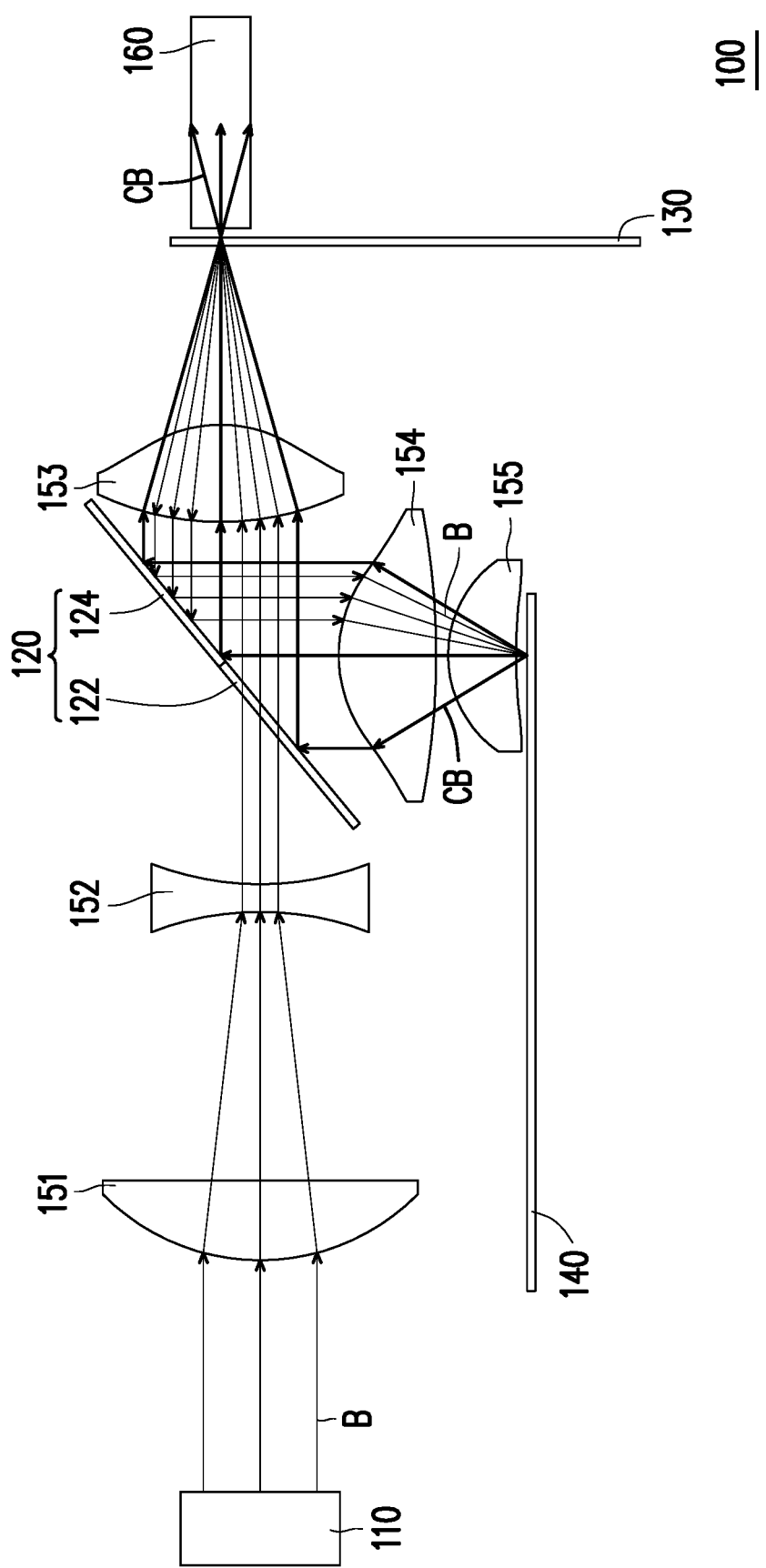
Figure 4B:
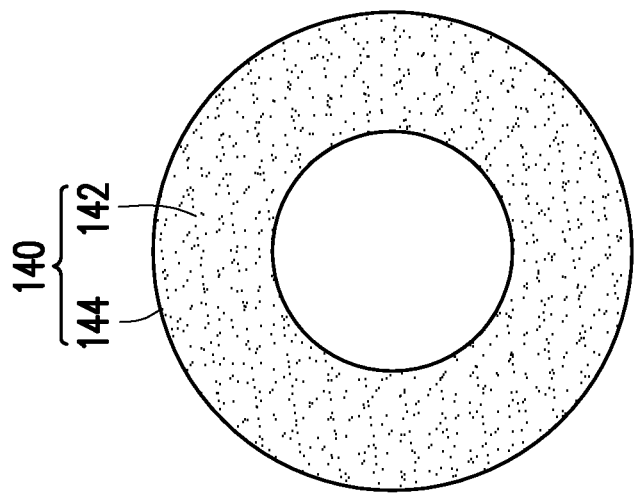
FIG. 4A and FIG. 4B respectively are a schematic side view and a schematic front view of a wavelength conversion module in FIG. 1.
Figure 4A:
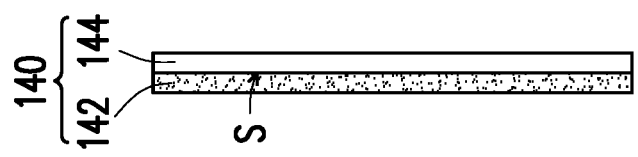
Figure 3:
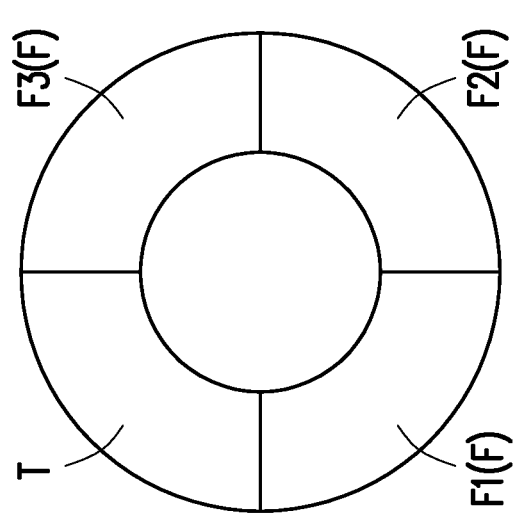
FIG. 3 is a schematic front view of a filter module in FIG. 1.

FIG. 1 is a schematic view of a projection apparatus according to an embodiment of the invention. FIG. 2A and FIG. 2B are diagrams of two optical paths of an illumination system of FIG. 1 of the invention in different time periods, wherein FIG. 2A presents a transmission path of an excitation light beam in an illumination light beam outputted from the illumination system, and FIG. 2B presents a transmission path of a converted light beam in the illumination light beam outputted from the illumination system. FIG. 3 is a schematic front view of a filter module in FIG. 1. FIG. 4A and FIG. 4B respectively are a schematic side view and a schematic front view of a wavelength conversion module in FIG. 1.

With reference to FIG. 1 to FIG. 2B, a projection apparatus 10 includes an illumination system 100, a light valve 200, and a projection lens 300. The illumination system 100 outputs an illumination light beam IB, wherein the illumination light beam IB originates from an excitation light beam B outputted from a filter module 130 in FIG. 2A and a converted light beam CB outputted from the filter module 130 in FIG. 2B. The light valve 200 is disposed on a transmission path of the illumination light beam IB and is adapted to convert the illumination light beam IB into an image light beam MB. For instance, the light valve 200 may be a digital micro-mirror device (DMD), a liquid-crystal-on-silicon panel (LCOS panel), or a transmissive liquid crystal panel, but the invention is not limited thereto. The projection lens 300 is disposed on a transmission path of the image light beam MB and projects the image light beam MB onto a screen, a wall, or other objects suitable for imaging.

The illumination system 100 includes an excitation light source 110, a light combining device 120, a filter module 130, and a wavelength conversion module 140. The excitation light source 110 is adapted to provide the excitation light beam B. For instance, the excitation light source 110, for example, includes one single light emitting device or a plurality of light emitting devices. The light emitting device may include a laser diode, a light emitting diode, or a combination of the foregoing two light emitting devices, and the plurality of light emitting devices may include laser diodes and light emitting diodes arranged in an array.

The light combining device 120 is disposed on a transmission path of the excitation light beam B emitted from the excitation light source 110. In this embodiment, the light combining device 120 includes a dichroic portion 122 and a reflection portion 124, and the dichroic portion 122 and the reflection portion 124 are disposed on the same device. For instance, the dichroic portion 122 and the reflection portion 124 are formed on different areas of the same carrier board. In another embodiment, the dichroic portion 122 and the reflection portion 124 may be formed on two physically-separated carrier boards, such that the dichroic portion 122 and the reflection portion 124 are separated from each other. The dichroic portion 122 is, for example, a dichroic mirror, and the reflection portion 124 is, for example, a mirror, but the invention is not limited thereto.

As shown in FIG. 2A, the dichroic portion 122 is disposed on the transmission path of the excitation light beam B emitted from the excitation light source 110, and the dichroic portion 122 allows the excitation light beam B to pass through. As shown in FIG. 2B, the dichroic portion 122 is also disposed on a transmission path of the converted light beam CB (referring to the thick solid line) reflected by the wavelength conversion module 140, and the dichroic portion 122 reflects the converted light beam CB. The reflection portion 124 is disposed on a transmission path of the excitation light beam B reflected by the filter module 130, and the reflection portion 124 reflects the excitation light beam B to the wavelength conversion module 140. In addition, the reflection portion 124 is also disposed on the transmission path of the converted light beam CB reflected by the wavelength conversion module 140, and the reflection portion 124 reflects the converted light beam CB to the filter module 130.

The filter module 130 is disposed on a transmission path of the excitation light beam B transmitted from the light combining device 120. The filter module 130 is, for example, a filter wheel. In this embodiment, the filter module 130 is disposed on a transmission path of the excitation light beam B passing through the dichroic portion 122 of the light combining device 120. As shown in FIG. 3, the filter module 130 includes a light passing-through area T allowing the excitation light beam B to pass through and at least one filter area F reflecting the excitation light beam B. A filter area allowing at least a portion of the excitation light beam B to pass through may be disposed in the light passing-through area T. In addition, a diffusion plate configured for effectively improving a laser speckle problem of the excitation light beam B may also be included in the light passing-through area T. The filter module 130 may include three filter areas, such as a first color filter area F1, a second color filter area F2, and a third color filter area F3 as shown in FIG. 3. A first color filter plate allowing a first color light beam to pass through and reflecting light beams of remaining colors (e.g., the excitation light beam B and a second color light beam) is disposed in the first color filter area F1. A second color filter plate allowing the second color light beam to pass through and reflecting light beams of the remaining colors (e.g., the excitation light beam B and the first color light beam) is disposed in the second color filter area F2. A third color filter plate allowing the converted light beam CB to pass through and reflecting the excitation light beam B is disposed in the third color filter area F3. In this embodiment, for example, the excitation light beam B is a blue light beam, the converted light beam CB is a yellow light beam, and the first color light beam and the second color light beam are respectively a red light beam and a green light beam, wherein the converted light beam CB includes the first color light beam and the second color light beam. A blue filter plate, a red filter plate, a green filter plate, and a yellow filter plate are respectively disposed in the light passing-through area T, the first color filter area F1, the second color filter area F2, and the third color filter area F3. Nevertheless, the number of the at least one filter area F, the color of each of the at least one filter area F, and arrangement of the filter areas F in the filter module 130 can be changed according to actual requirements and are not limited to what is shown in FIG. 3. For instance, the filter module 130 may omit the third color filter area F3. Note that the filter plate is adapted to filter out a portion of a wavelength in a light beam, so that the light beam passing through the filter plate has the required wavelength, and thus the filter plate has the function of purifying the color of the light beam. When the at least one filter area F (e.g., the first color filter area F1, the second color filter area F2, or the third color filter area F3) cuts into the transmission path of the excitation light beam B passing through the dichroic portion 122 of the light combining device 120, the at least one filter area F reflects the excitation light beam B.

The wavelength conversion module 140 is, for example, a phosphor wheel. The wavelength conversion module 140 and the filter module 130 are disposed at the same side of the light combining device 120, and the excitation light source 110 and the wavelength conversion module 140 are disposed at opposite sides of the light combining device 120. The wavelength conversion module 140 is disposed on a transmission path of the excitation light beam B reflected by the at least one filter area F. In this embodiment, the reflection portion 124 of the light combining device 120 is disposed on the transmission path of the excitation light beam B reflected by the at least one filter area F, and the wavelength conversion module 140 is disposed on a transmission path of the excitation light beam B reflected by the reflection portion 124 of the light combining device 120. In other words, the excitation light beam B reflected by the at least one filter area F is transmitted towards the wavelength conversion module 140 through being reflected by the reflection portion 124 of the light combining device 120. The wavelength conversion module 140 is adapted to convert the excitation light beam B reflected by the at least one filter area F into the converted light beam CB and reflects the converted light beam CB, as such, the converted light beam CB is transmitted towards the at least one filter area F.

As shown in FIG. 4A and FIG. 4B, the wavelength conversion module 140 may include a wavelength conversion layer 142 and a carrier board 144. The wavelength conversion layer 142 absorbs a short-wavelength light beam (the excitation light beam B) and is excited to emit a long-wavelength light beam (the converted light beam CB). For instance, the material of the wavelength conversion layer 142 may include phosphors, quantum dots, or a combination of the two materials. In addition, the material of the wavelength conversion layer 142 may also selectively include light-scattering particles to increase scattering efficiency. The carrier board 144 features a reflective characteristic and is adapted to reflect the converted light beam CB back to the light combining device 120. For instance, the carrier board 144 may be a metal carrier board or a carrier board having high reflection coating. In this way, the carrier board 144 features not only a reflective characteristic but also a heat dissipation characteristic. Alternatively, the carrier board 144 may be a light transmissive carrier board, and a reflection layer is formed at least on a surface S of the carrier board 144 facing the wavelength conversion layer 142. The wavelength conversion layer 142 is disposed on the surface S of the carrier board 144 facing the light combining device 120. On the transmission path of the excitation light beam B, the wavelength conversion layer 142 is disposed between the carrier board 144 and the light combining device 120, and the wavelength conversion layer 142 may be disposed along a circumference of the carrier board 144 to form a ring-shaped distribution. Nevertheless, the invention is not intended to limit how the wavelength conversion layer 142 is disposed on the carrier board 144.

With reference to FIG. 2A, FIG. 2B, and FIG. 3, the light passing-through area T and the at least one filter area F of the filter module 130 may alternately cut into the transmission path of the excitation light beam B transmitted from the light combining device 120. When the light passing-through area T of the filter module 130 cuts into the transmission path of the excitation light beam B transmitted from the dichroic portion 122 of the light combining device 120, as shown in FIG. 2A, the excitation light beam B passes through the light passing-through area T of the filter module 130 and is outputted from the filter module 130. On the other hand, when the at least one filter area F of the filter module 130 (the first color filter area F1, the second color filter area F2, or the third color filter area F3 as shown in FIG. 3) cuts into the transmission path of the excitation light beam B transmitted from the dichroic portion 122 of the light combining device 120, the converted light beam CB passes through the at least one filter area F of the filter module 130 and is outputted from the filter module 130. Specifically, the at least one filter area F reflects the excitation light beam B passing through the dichroic portion 122 of the light combining device 120. The reflection portion 124 of the light combining device 120 is disposed on the transmission path of the excitation light beam B reflected by the at least one filter area F of the filter module 130, as such, the excitation light beam B passing through the dichroic portion 122 is reflected by the at least one filter area F and the reflection portion 124 in sequence and is transmitted to the wavelength conversion module 140. The wavelength conversion module 140 converts the excitation light beam B into the converted light beam CB, and the converted light beam CB reflected by the wavelength conversion module 140 is transmitted to the filter module 130 through being reflected by the dichroic portion 122 and the reflection portion 124. The excitation light beam B passing through the light passing-through area T in FIG. 2A and the converted light beam CB passing through the at least one filter area F in FIG. 2B form the illumination light beam IB in FIG. 1.

FIG. 2B presents the optical path when the third color filter area F3 (the yellow filter area) of FIG. 3 cuts into the transmission path of the excitation light beam B passing through the dichroic portion 122 of the light combining device 120. When the third color filter area F3 cuts into the transmission path of the excitation light beam B passing through the dichroic portion 122 of the light combining device 120, at least a portion of the (or the entire) converted light beam CB (the yellow light beam) transmitted to the filter module 130 continues to pass through the third color filter area F3 and is outputted from the filter module 130. On the other hand, when the first color filter area F1 (the red filter area) of FIG. 3 cuts into the transmission path of the excitation light beam B passing through the dichroic portion 122 of the light combining device 120, the first color light beam (the red light beam) in the converted light beam CB (the yellow light beam) transmitted to the filter module 130 continues to pass through the first color filter area F1 and is outputted from the filter module 130, and the second color light beam (the green light beam) in the converted light beam CB (the yellow light beam) transmitted to the filter module 130 is filtered (reflected or absorbed) by the first color filter area F1. When the second color filter area F2 (the green filter area) of FIG. 3 cuts into the transmission path of the excitation light beam B passing through the dichroic portion 122 of the light combining device 120, the second color light beam (the green light beam) in the converted light beam CB (the yellow light beam) transmitted to the filter module 130 continues to pass through the second color filter area F2 and is outputted from the filter module 130, and the first color light beam (the red light beam) in the converted light beam CB (the yellow light beam) transmitted to the filter module 130 is filtered (reflected or absorbed) by the second color filter area F2.

The excitation light beam B emitted from the excitation light source 110 may be transmitted to the filter module 130 first through the light combining device 120 without being transmitted to the wavelength conversion module 140, and the excitation light beam B transmitted to the filter module 130 is outputted from the filter module 130 through the light passing-through area T of the filter module 130. Hence, an opening allowing the excitation light beam B to pass through is not required to be formed in the wavelength conversion module 140 (e.g., in the carrier board 144), and a plurality of light transmission devices configured for transmitting the excitation light beam B passing through the opening back to the light combining device 120 are not required to be additionally disposed either. Accordingly, the illumination system 100 may feature advantages such as lowered costs and reduced volume. In addition, the wavelength conversion module 140 converts the blue excitation light beam B into the yellow converted light beam CB, and the yellow converted light beam CB is then filtered through the plurality of filter areas F of the filter module 130 to produce light beams of a variety of colors (e.g., red light, green light, or yellow light) required for illumination. That is, in the wavelength conversion module 140, only an optical wavelength conversion material configured for converting the yellow light is required to be disposed on the carrier board 144, and the wavelength conversion module 140 is not required to be divided into a light passing-through area and a plurality of wavelength conversion areas with different optical wavelength conversion materials being disposed in corresponding to the light passing-through area T and the plural filter areas F of the filter module 130. Therefore, rotation of the filter module 130 may not be synchronized with rotation of the wavelength conversion module 140. For instance, the wavelength conversion module 140 may not rotate. Alternatively, the wavelength conversion module 140 may rotate but may not have to rotate synchronously with the filter module 130, and the rotation of the filter module 130 and the rotation of the wavelength conversion module 140 are not required to be designed to be synchronous, as such, time for processing electric signals in the projection apparatus 10 is significantly saved. In this way, the light valve 200 supporting synchronous rotation only with the filter module 130 may be selected for the projection apparatus 10, so as to reduce costs of the projection apparatus 10. Accordingly, the projection apparatus 10 applying the illumination system 100 may also feature the advantages such as reduced volume and lowered costs.

According to different requirements, the illumination system 100 may selectively include other devices. For instance, the illumination system 100 may further include a plurality of lens devices such as a lens device 151, a lens device 152, a lens device 153, a lens device 154, and a lens device 155 as shown in FIG. 1, so as to converge the light beams or collimate the light beams. Besides, the illumination system 100 may also include a light uniforming device 160. The light uniforming device 160 is disposed on transmission paths of the excitation light beam B and the converted light beam CB outputted from the filter module 130, so as to enhance uniformity of the light beams. For instance, the light uniforming device 160 is a light integration rod or a lens array, but the invention is not limited thereto.

Figure 5:
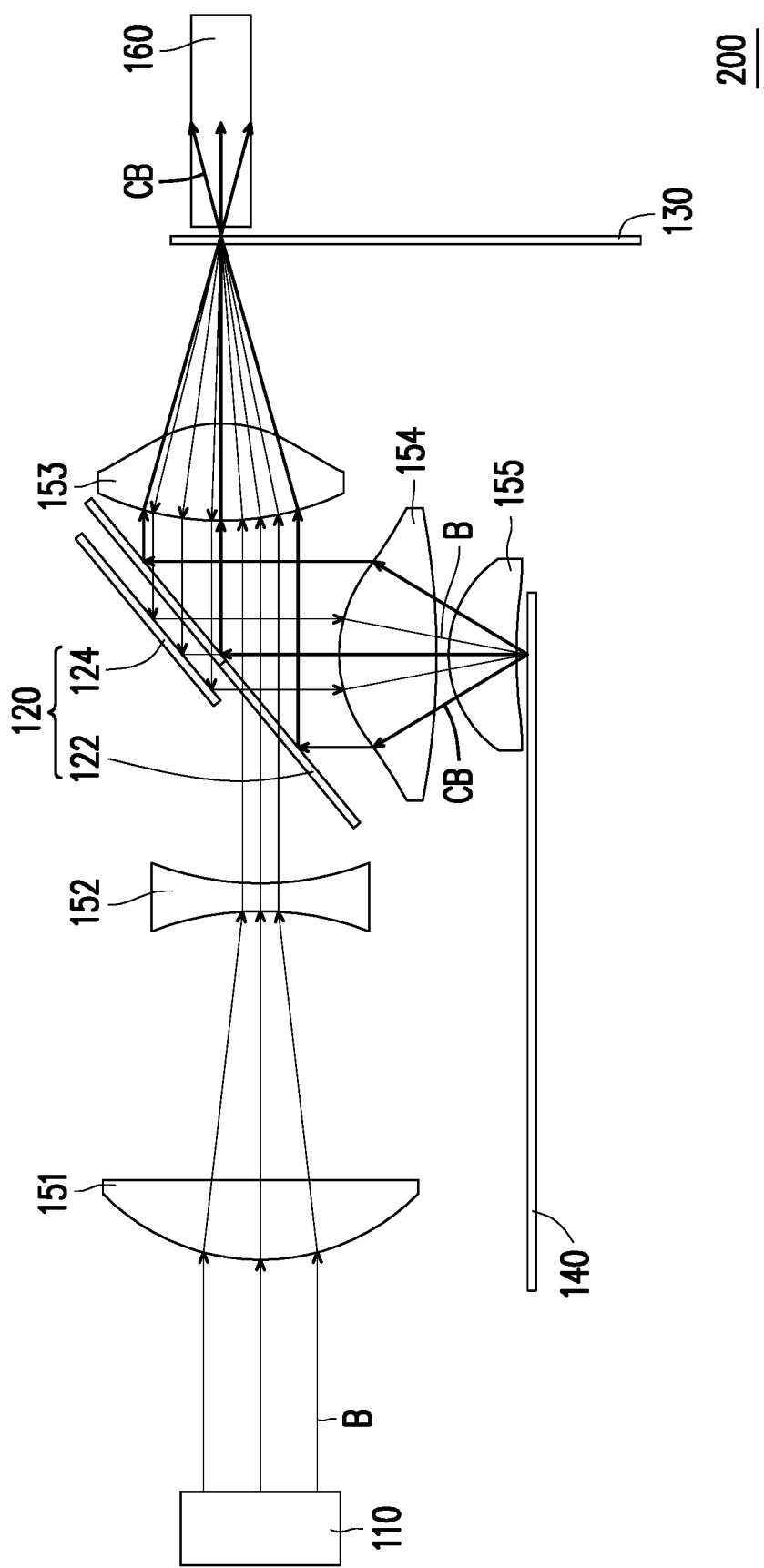
FIG. 5 is a schematic diagram of an illumination system according to a second embodiment of the invention.

FIG. 5 is a schematic diagram of an illumination system according to another embodiment of the invention, and FIG. 5 presents an optical path when the third color filter area F3 (the yellow filter area) of FIG. 3 cuts into the transmission path of the excitation light beam B passing through the dichroic portion 122 of the light combining device 120.

With reference to FIG. 5, an illumination system 200 is similar to the illumination system 100 of FIG. 1, wherein identical devices are denoted by the same reference numerals, and details thereof will not be repeated hereinafter. A difference between the illumination system 200 and the illumination system 100 includes the following. In the illumination system 200, the dichroic portion 122 and the reflection portion 124 are separated from each other, and the dichroic portion 122 is located between the reflection portion 124 and the wavelength conversion module 140.

When the light passing-through area T of the filter module 130 cuts into the transmission path of the excitation light beam B transmitted from the dichroic portion 122 of the light combining device 120, FIG. 2A may be referenced for a light path of the excitation light beam B. On the other hand, when the at least one filter area F (referring to FIG. 3) of the filter module 130 cuts into the transmission path of the excitation light beam B passing through the dichroic portion 122 of the light combining device 120, the excitation light beam B passing through the dichroic portion 122 passes through the dichroic portion 122 and is transmitted to the reflection portion 124, is reflected by the reflection portion 124, passes through the dichroic portion 122 again, and is transmitted to the wavelength conversion module 140 in sequence after being reflected by the at least one filter area F. The converted light beam CB reflected by the wavelength conversion module 140 is transmitted towards the filter module 130 through being reflected by the dichroic portion 122. To be specific, since the dichroic portion 122 reflects the converted light beam CB, and the dichroic portion 122 is located between the reflection portion 124 and the wavelength conversion module 140, the converted light beam CB is reflected by the dichroic portion 122 when being transmitted to the dichroic portion 122. That is, the converted light beam CB is not transmitted to the reflection portion 124 and is not reflected by the reflection portion 124 either.

As described in the foregoing embodiments, the dichroic portion 122 of the light combining device 120 allows the excitation light beam B to pass through and reflects the converted light beam CB. In addition, the excitation light source 110 is turned on in any time period.

Figure 6:
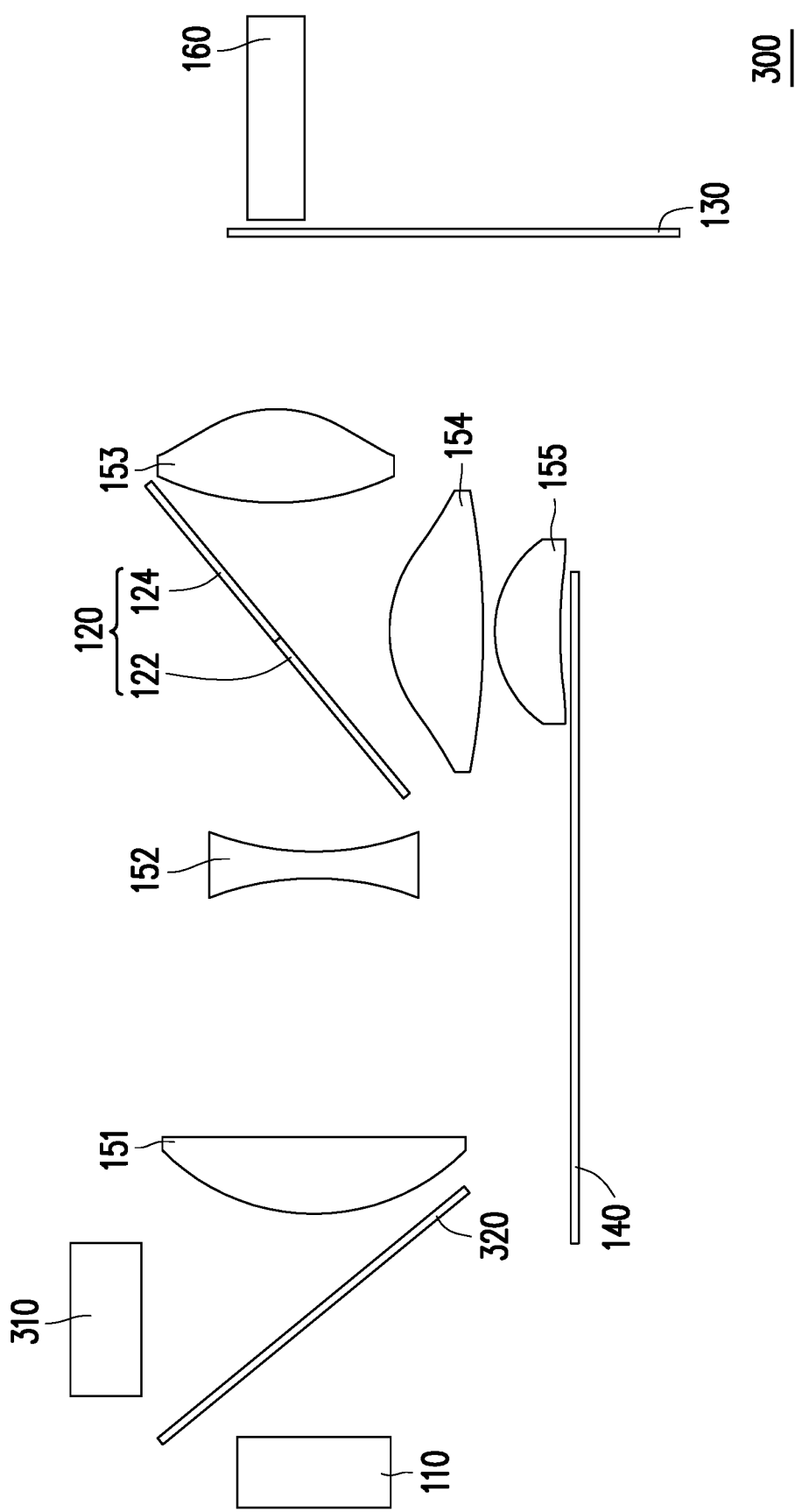
FIG. 6 is a schematic diagram of an illumination system according a third embodiment of the invention.
Figure 7A:
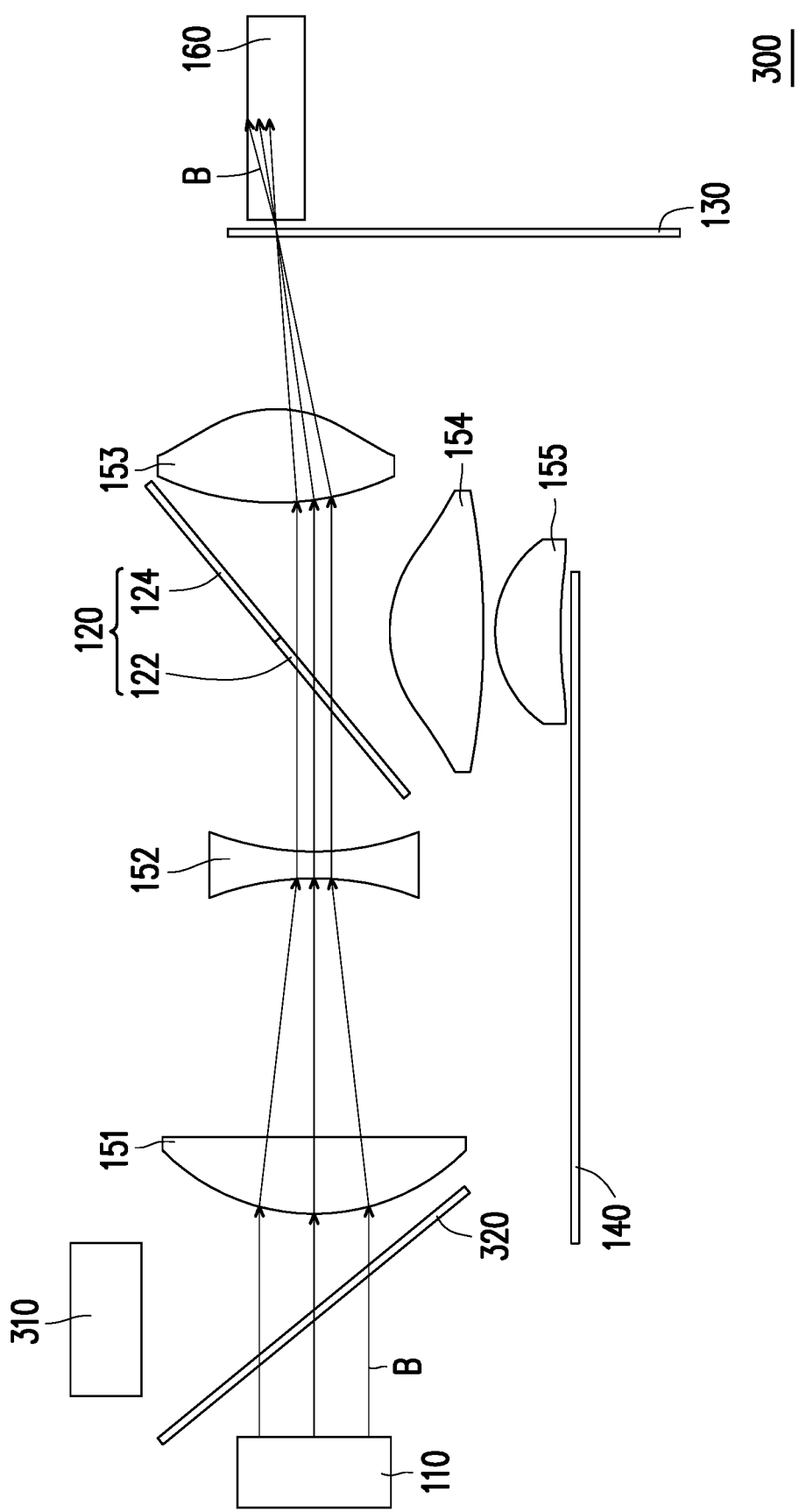
FIG. 7A to FIG. 7C are diagrams of three optical paths of the illumination system of the third embodiment of the invention in different time periods.
Figure 7B:
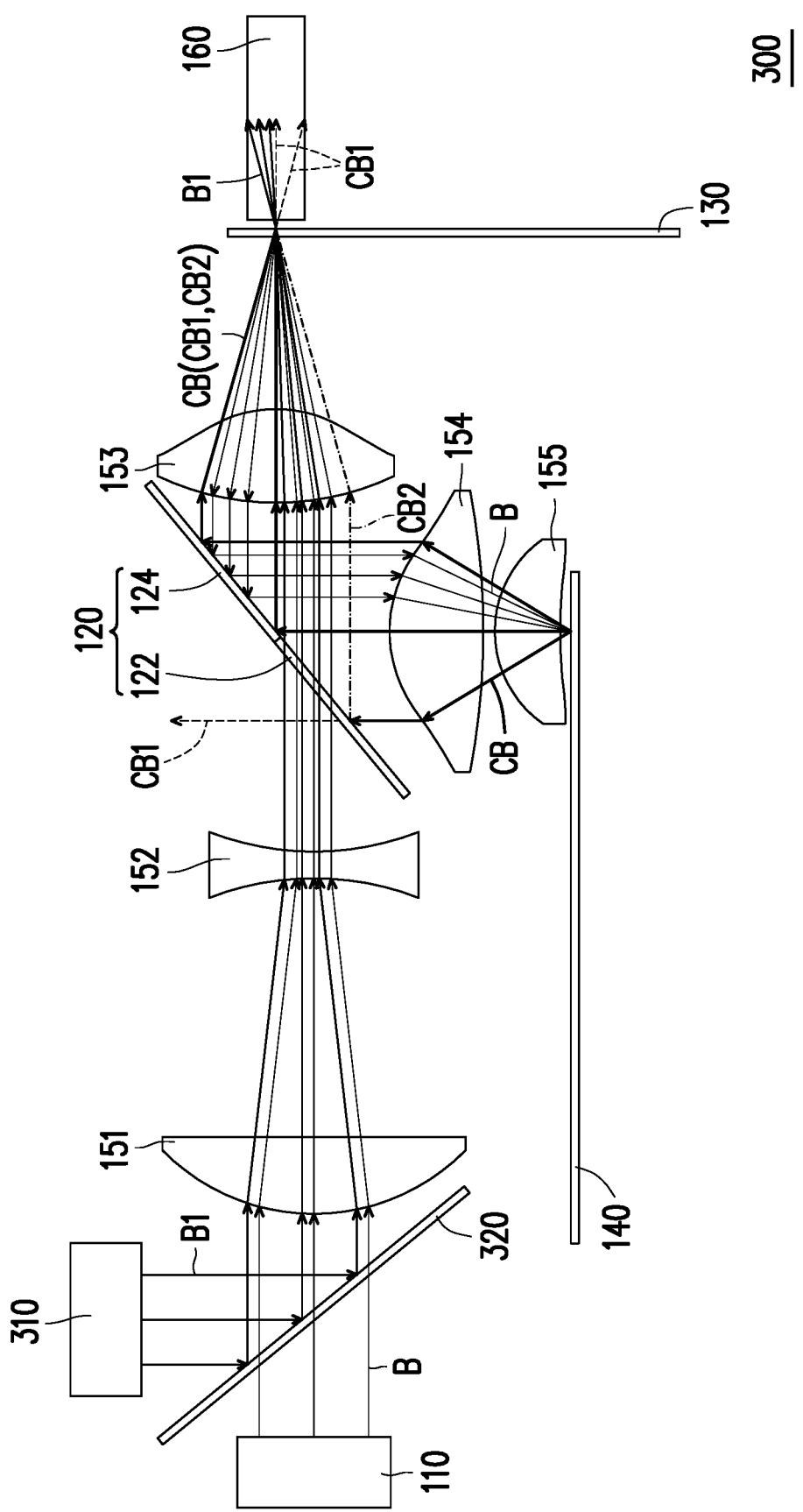
Figure 7C:
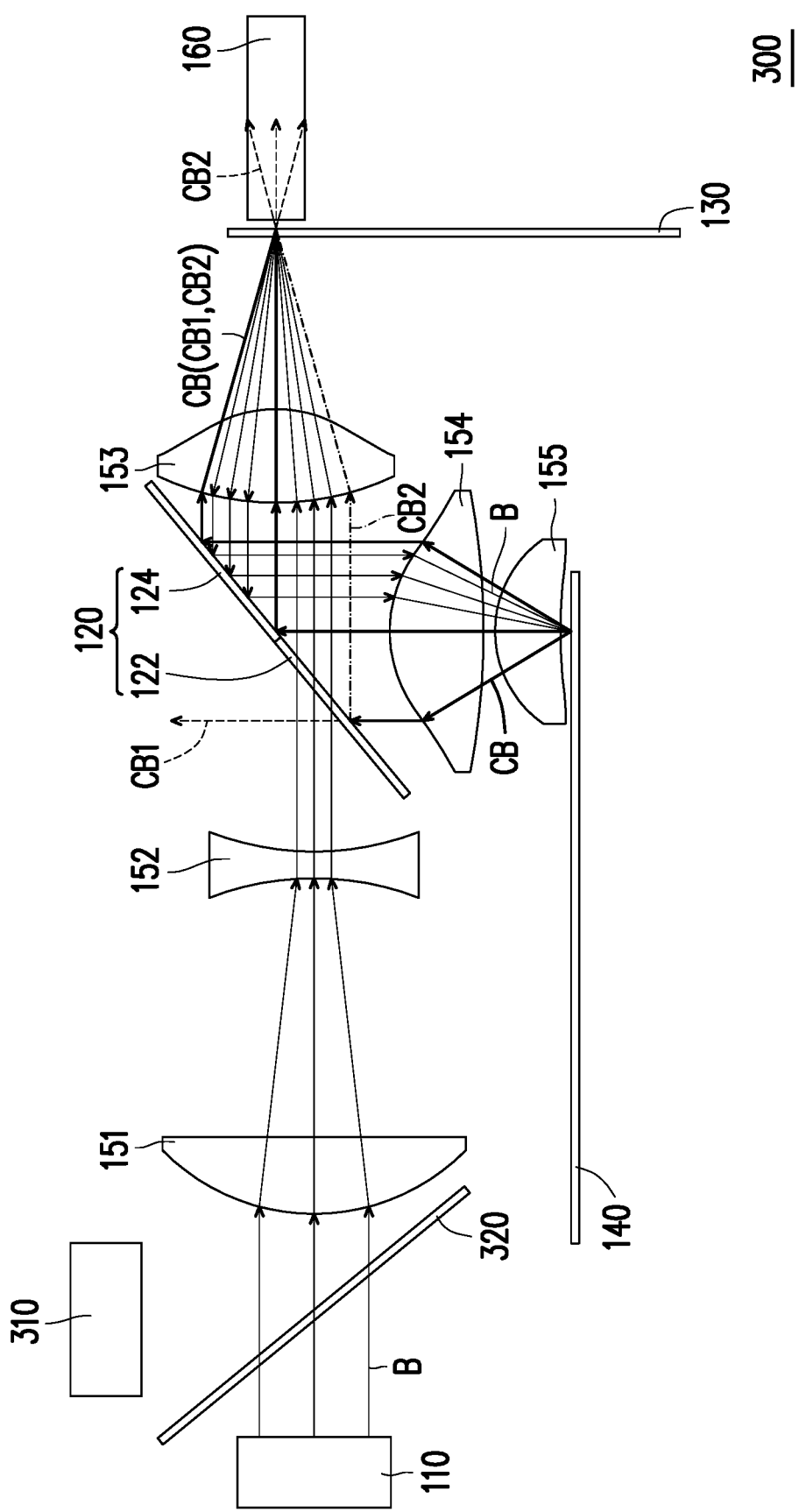

FIG. 6 is a schematic diagram of an illumination system according a third embodiment of the invention. FIG. 7A to FIG. 7C are views of three optical paths of the illumination system of the third embodiment of the invention in different time periods, wherein FIG. 7A presents a transmission path of an excitation light beam in an illumination light beam outputted from the illumination system, FIG. 7B presents a transmission path of a first color light beam in the illumination light beam outputted from the illumination system, and FIG. 7C presents a transmission path of a second color light beam in the illumination light beam outputted from the illumination system. In the third embodiment, the filter module may include or may not include the third color filter area F3 shown in FIG. 3. Description of the third color filter area F3 has been specified above, and details thereof will not be repeated hereinafter.

With reference to FIG. 6 to FIG. 7C, an illumination system 300 is similar to the illumination system 100 of FIG. 1, wherein identical devices are denoted by the same reference numerals, and details thereof will not be repeated hereinafter. A difference between the illumination system 300 and the illumination system 100 includes the following. The illumination system 300 further includes a first color supplementary light source 310 and a dichroic device 320. The first color supplementary light source 310 provides a first color light beam B1 (the red light beam). The dichroic device 320, for example, is a dichroic mirror. The dichroic device 320 is disposed on the transmission path of the excitation light beam B emitted from the excitation light source 110 and on a transmission path of the first color light beam B1 emitted from the first color supplementary light source 310. The excitation light beam B emitted from the excitation light source 110 and the first color light beam B1 emitted from the first color supplementary light source 310 are transmitted to the light combining device 120 through the dichroic device 320. In this embodiment, the dichroic device 320 allows the excitation light beam B to pass through and reflects the first color light beam B1, but the invention is not limited thereto. In another embodiment, the dichroic device 320 may allow the first color light beam B1 to pass through and reflects the excitation light beam B.

The first color supplementary light source 310 is adapted to increase a red light component in the illumination light beam, so as to improve the problem of impurity of the red light color in the prior art. The first color supplementary light source 310 is, for example, a red laser diode or a red light emitting diode. When the first color supplementary light source 310 provides the first color light beam B1, the first color filter area F1 shown in FIG. 3 cuts into a transmission path of the first color light beam B1 transmitted from the light combining device 120. Moreover, the first color supplementary light source 310 is turned off when the light passing-through area T or the second color filter area F2 cuts into the transmission path of the excitation light beam B transmitted from the light combining device 120. In other words, the first color supplementary light source 310 is turned on only when the first color filter area F1 cuts into the transmission path of the first color light beam B1 transmitted from the light combining device 120 and is turned off in the rest of the time periods. In addition, the excitation light source 110 may be turned on in any time period. Alternatively, in other embodiments, the excitation light source 110 may be turned off when the first color supplementary light source 310 is turned on, and the excitation light source 110 may be turned on when the first color supplementary light source 310 is turned off. Description is provided in detail as follows.

With reference to FIG. 7A to FIG. 7C, the dichroic portion 122 is disposed on transmission paths of the excitation light beam B and the first color light beam B1 transmitted from the dichroic device 320. The dichroic portion 122 allows the excitation light beam B and the first color light beam B1 transmitted from the dichroic device 320 to pass through and reflects light beams of the remaining colors (e.g., the second color light beam). The first color filter area F1 of the filter module 130 (referring to FIG. 3) allows at least a portion of the first color light beam B1 to pass through and reflects light beams of the remaining colors. The reflection portion 124 is disposed on a transmission path of the excitation light beam B reflected by the first color filter area F1 or the second color filter area F2 and reflects the excitation light beam B.

With reference to FIG. 7A, when the light passing-through area T of the filter module 130 (referring to FIG. 3) cuts into the transmission path of the excitation light beam B transmitted from the dichroic portion 122 of the light combining device 120, the first color supplementary light source 310 is turned off, and the excitation light beam B emitted from the excitation light source 110 passes through the dichroic device 320, the lens device 151, the lens device 152, the dichroic portion 122, the lens device 153, and the light passing-through area T of the filter module 130 in sequence and is outputted from the filter module 130.

With reference to FIG. 7B, when the first color filter area F1 of the filter module 130 (referring to FIG. 3) cuts into the transmission path of the first color light beam B1 transmitted from the light combining device 120, the first color light beam B1 emitted from the first color supplementary light source 310 passes through the lens device 151, the lens device 152, the dichroic portion 122, the lens device 153, and the first color filter area F1 of the filter module 130 in sequence and is outputted from the filter module 130 after being reflected by the dichroic device 320.

When the first color filter area F1 of the filter module 130 cuts into the transmission path of the first color light beam B1 transmitted from the light combining device 120, the excitation light source 110 may be turned on. The excitation light beam B emitted from the excitation light source 110 passes through the dichroic device 320, the lens device 151, the lens device, 152, the dichroic portion 122, and the lens device 153 in sequence and then is reflected by the first color filter area F1 of the filter module 130. The reflected excitation light beam B then passes through the lens device 153, is reflected by the reflection portion 124, passes through the lens device 154 and the lens device 155, is transmitted to the wavelength conversion module 140, and is converted into the converted light beam CB. The converted light beam CB is reflected by the wavelength conversion module 140, passes through the lens device 155 and the lens device 154 in sequence, and is then transmitted to dichroic portion 122 and the reflection portion 124. The dichroic portion 122 allows a first color light beam CB1 in the converted light beam CB to pass through and reflects a second color light beam CB2 in the converted light beam CB. The reflection portion 124 reflects the first color light beam CB1 and the second color light beam CB2 in the converted light beam CB. The first color filter area F1 of the filter module 130 allows the first color light beam CB1 in the converted light beam CB to pass through and filters (reflects/absorbs) the second color light beam CB2 in the converted light beam CB. In other words, the light beams passing through the first color filter area F1 include the first color light beam B1 emitted from the first color supplementary light source 310 and the first color light beam CB1 in the converted light beam CB. In another embodiment, when the first color filter area F1 of the filter module 130 cuts into the transmission path of the first color light beam B1 transmitted from the light combining device 120, the excitation light source 110 may be turned off as well. In this way, the light beam passing through the first color filter area F1 includes only the first color light beam B1 emitted from the first color supplementary light source 310 and does not include the first color light beam CB1 in the converted light beam CB.

With reference to FIG. 7C, when the second color filter area F2 of the filter module 130 (referring to FIG. 3) cuts into the transmission path of the excitation light beam B emitted from the dichroic portion 122 of the light combining device 120, the first color supplementary light source 310 is turned off. Moreover, the transmission paths of the excitation light beam B and the converted light beam CB are identical to that described in FIG. 7B, and thus no further description is provided herein. A difference between FIG. 7C and FIG. 7B is that in FIG. 7C, the second color filter area F2 of the filter module 130 (referring to FIG. 3) cuts into the transmission path of the excitation light beam B transmitted from the dichroic portion 122 of the light combining device 120, wherein the second color filter area F2 of the filter module 130 allows at least a portion of the second color light beam CB2 in the converted light beam CB to pass through and filters (reflects/absorbs) light beams of the remaining colors (e.g., reflects the first color light beam CB1 in the converted light beam CB). In other words, the light beam passing through the second color filter area F2 is the second color light beam CB2 in the converted light beam CB.

Figure 8:
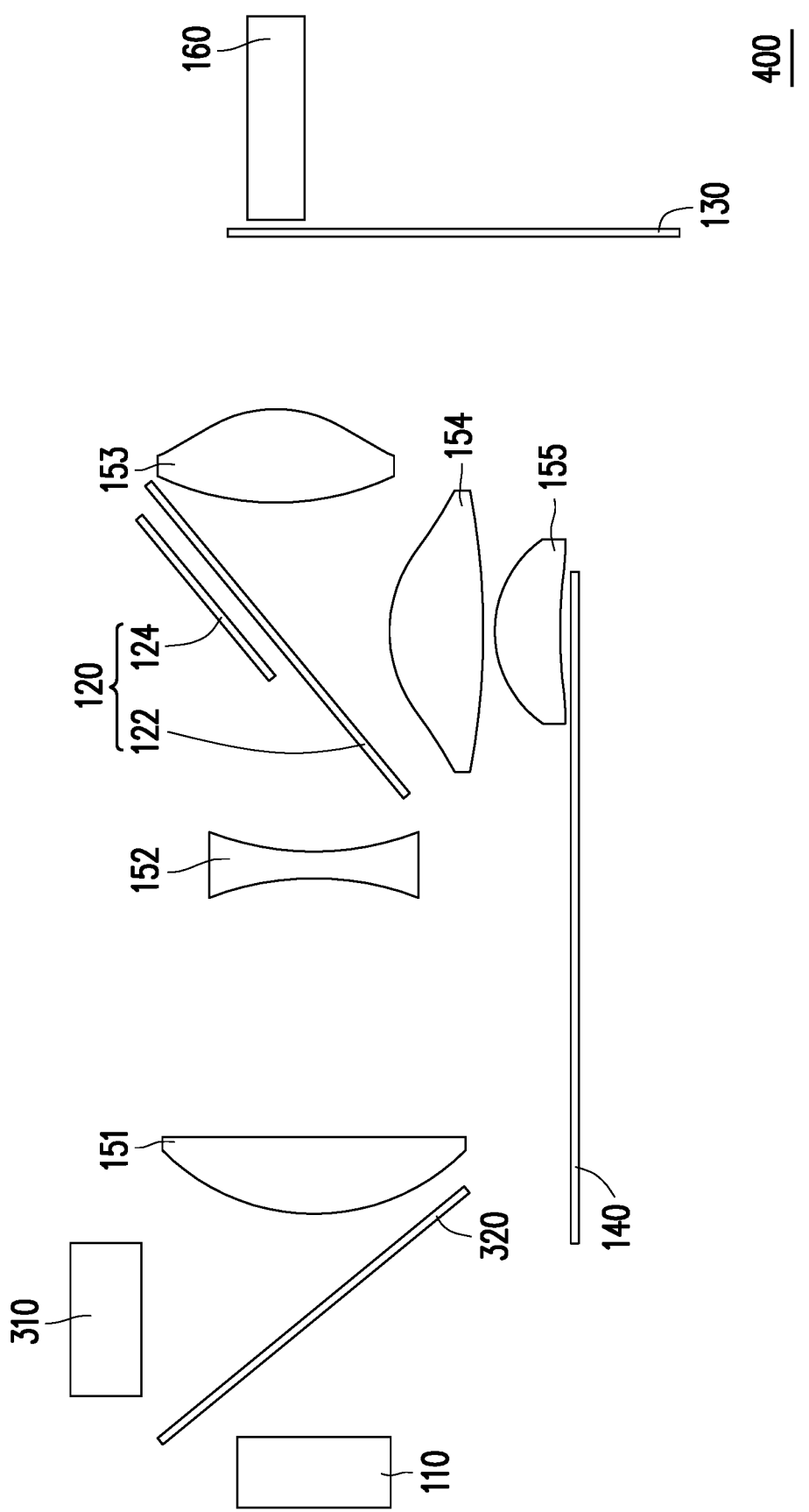
FIG. 8 is a schematic diagram of an illumination system according a fourth embodiment of the invention.
Figure 9A:
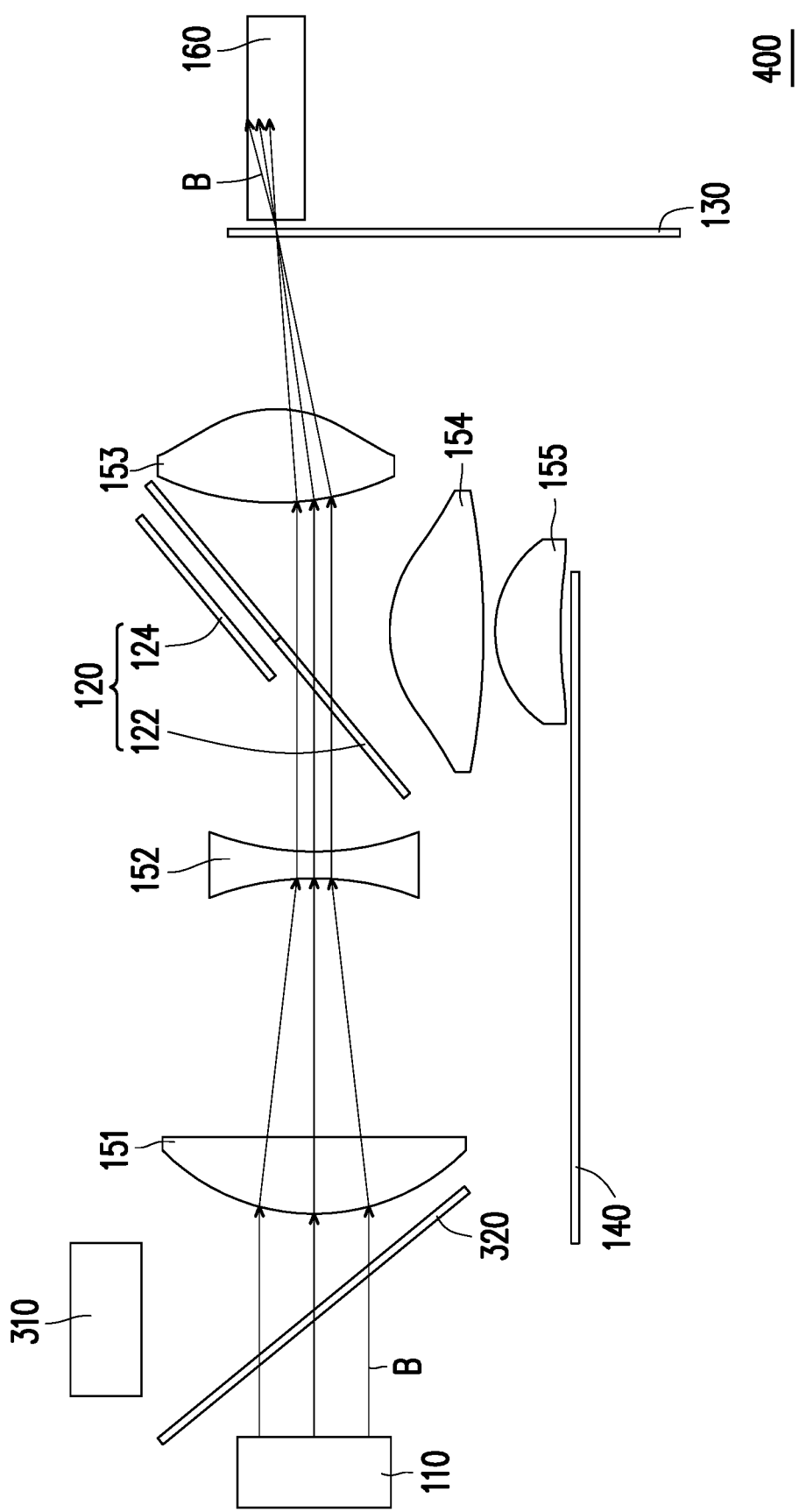
FIG. 9A to FIG. 9C are diagrams of three optical paths of the illumination system of the fourth embodiment of the invention in different time periods.
Figure 9B:
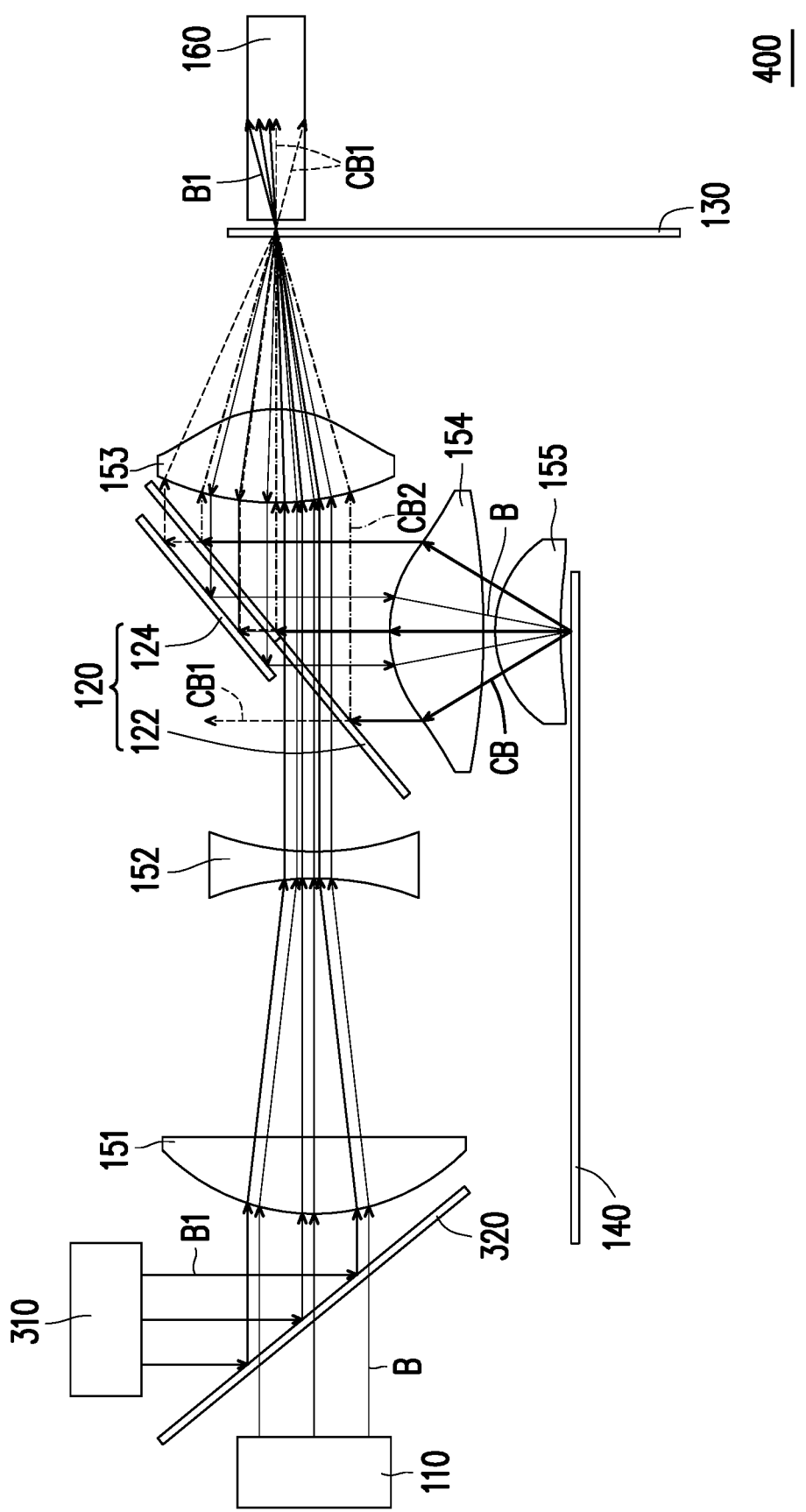
Figure 9C:
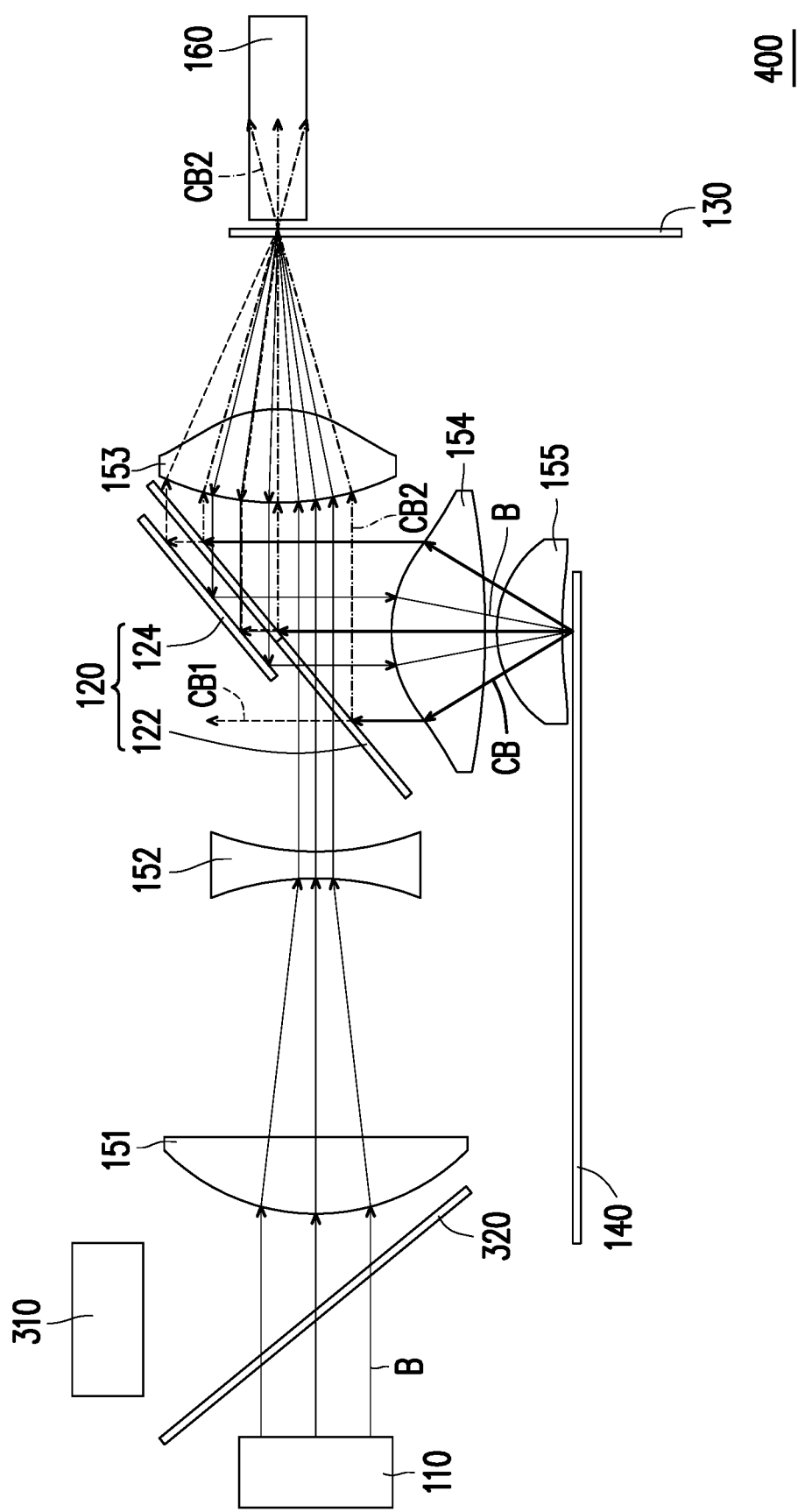

FIG. 8 is a schematic diagram of an illumination system according a fourth embodiment of the invention. FIG. 9A to FIG. 9C are diagrams of three optical paths of the illumination system of the fourth embodiment of the invention in different time periods, wherein FIG. 9A presents a transmission path of an excitation light beam in an illumination light beam outputted from the illumination system, FIG. 9B presents a transmission path of a first color light beam in the illumination light beam outputted from the illumination system, and FIG. 9C presents a transmission path of a second color light beam in the illumination light beam outputted from the illumination system. In the fourth embodiment, the filter module may include or may not include the third color filter area F3 shown in FIG. 3. Description of the third color filter area F3 has been specified above, and details thereof will not be repeated hereinafter.

With reference to FIG. 8 to FIG. 9C, an illumination system 400 is similar to the illumination system 300 of FIG. 6, wherein identical devices are denoted by the same reference numerals, and details thereof will not be repeated hereinafter. A difference between the illumination system 400 and the illumination system 300 includes the following. In the illumination system 400, the dichroic portion 122 and the reflection portion 124 are separated from each other, and the dichroic portion 122 is located between the reflection portion 124 and the wavelength conversion module 140.

With reference to FIG. 9A, when the light passing-through area T of the filter module 130 (referring to FIG. 3) cuts into the transmission path of the excitation light beam B transmitted from the dichroic portion 122 of the light combining device 120, the transmission path of the excitation light beam B is identical to that shown in FIG. 7A, and thus no further description is provided herein.

With reference to FIG. 9B, when the first color filter area F1 of the filter module 130 (referring to FIG. 3) cuts into the transmission path of the first color light beam B1 transmitted from the light combining device 120, the transmission path of the first color light beam B1 transmitted from the first color supplementary light source 310 is identical to that shown in FIG. 7B, and thus no further description is provided herein.

When the first color filter area F1 of the filter module 130 cuts into the transmission path of the first color light beam B1 transmitted from the light combining device 120, the excitation light source 110 is turned on and the first color supplementary light source 310 is turned on. In FIG. 9B, the transmission paths of the excitation light beam B and the converted light beam CB are approximately similar to the transmission paths of the excitation light beam B and the converted light beam CB in FIG. 7B, and a difference therebetween is described as follows. The excitation light beam B reflected by the first color filter area F1 of the filter module 130 passes through the lens device 153 and the dichroic portion 122 in sequence, is reflected by the reflection portion 124, passes through the dichroic portion 122 again, passes through the lens device 154 and the lens device 155, and is then transmitted to the wavelength conversion module 140 and converted into the converted light beam CB. The converted light beam CB is reflected by the wavelength conversion module 140, passes through the lens device 155 and the lens device 154 in sequence, and is then transmitted to dichroic portion 122. The dichroic portion 122 allows a first color light beam CB1 in the converted light beam CB to pass through and reflects a second color light beam CB2 in the converted light beam CB. At least a portion of the first color light beam CB1 passing through the dichroic portion 122 passes through the dichroic portion 122 again through being reflected by the reflection portion 124 and is transmitted towards the first color filter area F1 of the filter module 130. The first color filter area F1 of the filter module 130 allows the first color light beam B1 of the first color supplementary light source 310 and the first color light beam CB1 in the converted light beam CB to pass through and reflects the second color light beam CB2 in the converted light beam CB.

With reference to FIG. 9C, when the second color filter area F2 of the filter module 130 (referring to FIG. 3) cuts into the transmission path of the excitation light beam B transmitted from the dichroic portion 122 of the light combining device 120, the first color supplementary light source 310 is turned off. Moreover, the transmission paths of the excitation light beam B and the converted light beam CB are identical to that described in FIG. 9B, and thus no further description is provided herein. A difference between FIG. 9C and FIG. 9B is that in FIG. 9C, the second color filter area F2 of the filter module 130 (referring to FIG. 3) cuts into the transmission path of the excitation light beam B transmitted from the dichroic portion 122 of the light combining device 120, wherein the second color filter area F2 of the filter module 130 allows at least a portion of the second color light beam CB2 in the converted light beam CB to pass through and filters (reflects/absorbs) light beams of the remaining colors (e.g., reflects the first color light beam CB1 in the converted light beam CB).

As described in the foregoing embodiments, the dichroic portion 122 of the light combining device 120 allows the excitation light beam B, the first color light beam B1, and the first color light beam B1 in the converted light beam CB to pass through and reflects the second color light beam CB2.

Figure 10:
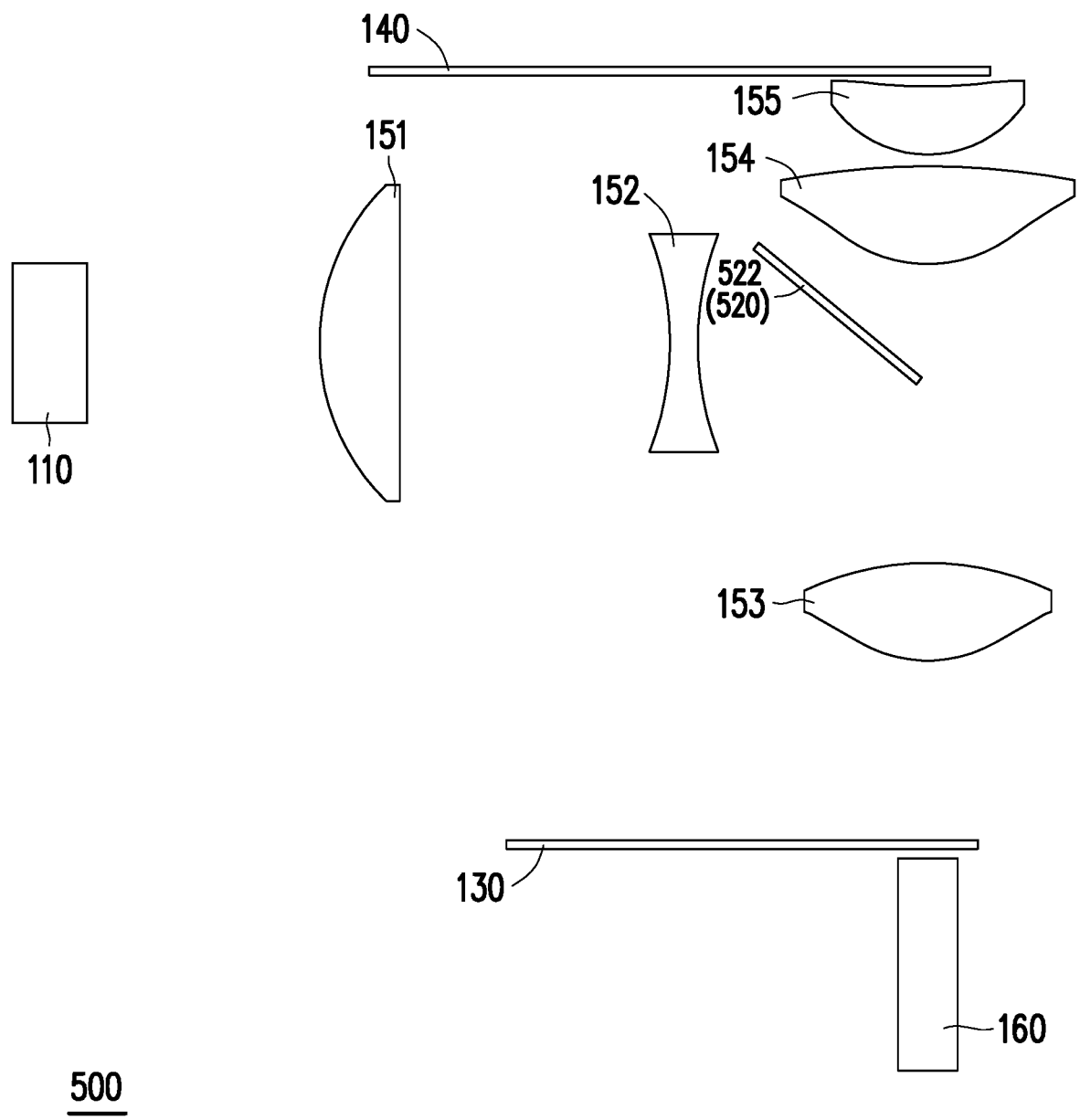
FIG. 10 is a schematic diagram of an illumination system according a fifth embodiment of the invention.
Figure 11A:
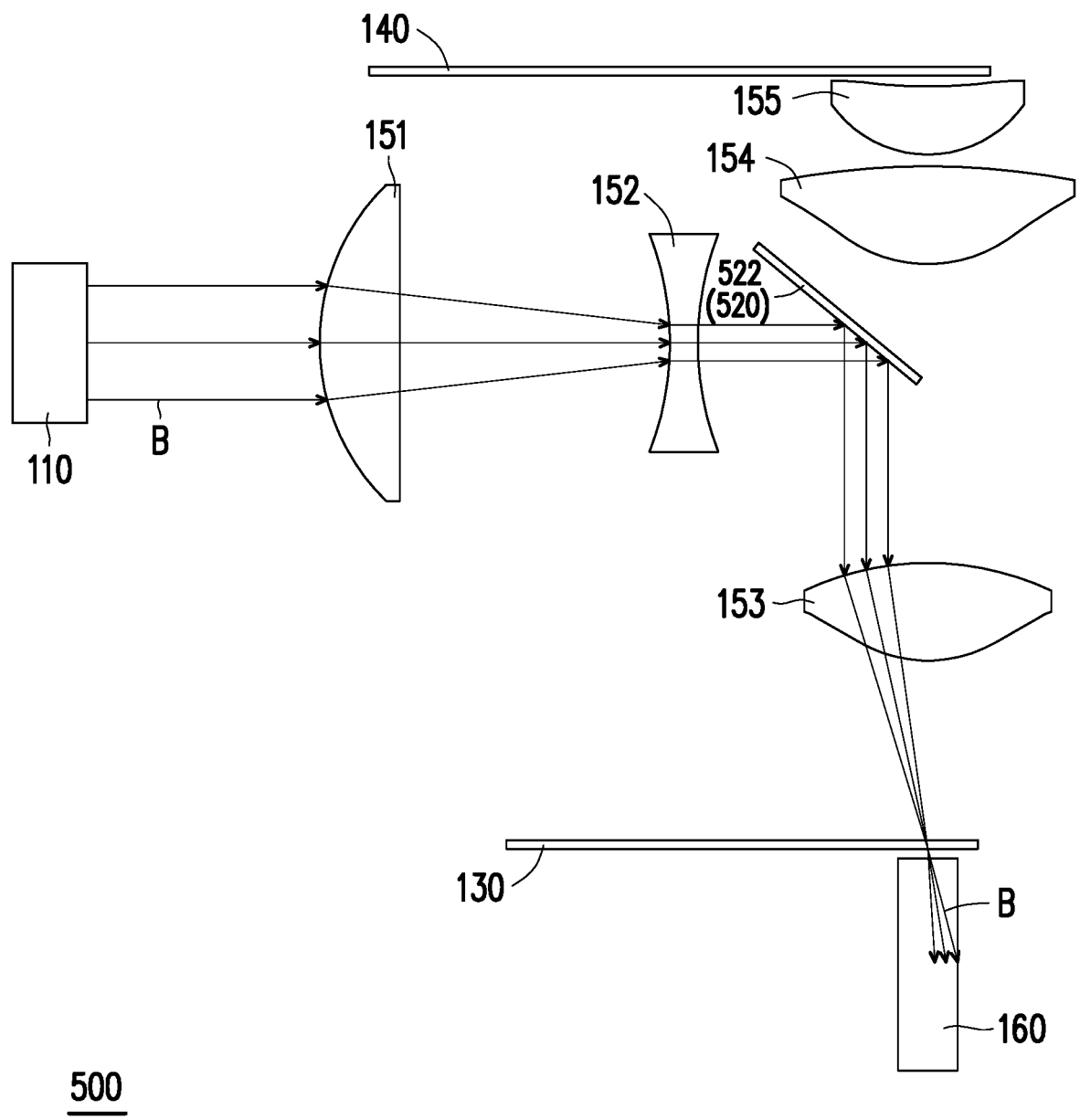
FIG. 11A and FIG. 11B are diagrams of two optical paths of the illumination system of the fifth embodiment of the invention in different time periods.
Figure 11B:
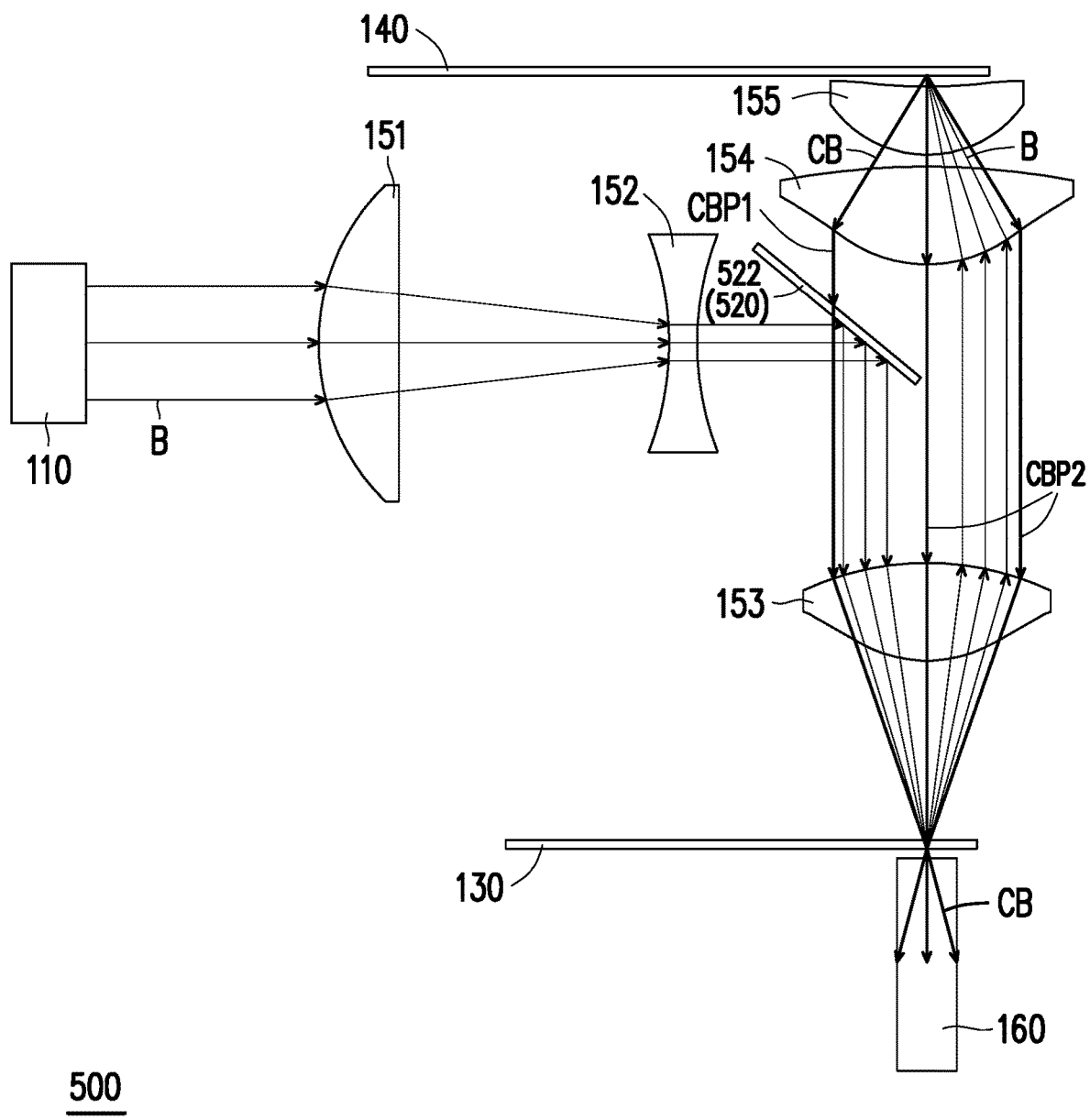

FIG. 10 is a schematic diagram of an illumination system according a fifth embodiment of the invention. FIG. 11A and FIG. 11B are diagrams of two optical paths of the illumination system of the fifth embodiment of the invention in different time periods, wherein FIG. 11A presents a transmission path of an excitation light beam in an illumination light beam outputted from the illumination system, and FIG. 11B presents a transmission path of a converted light beam in the illumination light beam outputted from the illumination system. Further, FIG. 11B presents the optical path when the third color filter area F3 (the yellow filter area) of FIG. 3 cuts into the transmission path of the excitation light beam B passing through the dichroic portion 122 of the light combining device 120.

With reference to FIG. 10 to FIG. 11B, an illumination system 500 is similar to the illumination system 100 of FIG. 1, wherein identical devices are denoted by the same reference numerals, and details thereof will not be repeated hereinafter. A difference between the illumination system 500 and the illumination system 100 includes the following. In the illumination system 500, a light combining device 520 includes a dichroic portion 522 but does not include the reflection portion 124 of FIG. 1. The dichroic portion 522 reflects the excitation light beam B and allows the converted light beam CB to pass through. In addition, the dichroic portion 522 is disposed on the transmission path of the excitation light beam B emitted from the excitation light source 110 and on a transmission path of a first portion CBP1 of the converted light beam CB reflected by the wavelength conversion module 140. Moreover, the dichroic portion 522 is disposed outside a transmission path of a second portion CBP2 of the converted light beam CB reflected by the wavelength conversion module 140. In other words, before the converted light beam CB is transmitted to the filter module 130, only the first portion CBP1 of the converted light beam CB passes through the dichroic portion 522, and the second portion CBP2 of the converted light beam CB does not pass through the dichroic portion 522.

With reference to FIG. 11A, when the light passing-through area T of the filter module 130 (referring to FIG. 3) cuts into a transmission path of the excitation light beam B transmitted from the dichroic portion 522 of the light combining device 520, the excitation light beam B emitted from the excitation light source 110 passes through the lens device 151 and the lens device 152 in sequence, is reflected by the dichroic portion 522, passes through the lens device 153 and the light passing-through area T of the filter module 130 in sequence, and is outputted from the filter module 130.

With reference to FIG. 11B, when the at least one filter area F of the filter module 130 (referring to FIG. 3) cuts into the transmission path of the excitation light beam B transmitted from dichroic portion 522 of the light combining device 520, the excitation light beam B emitted from the excitation light source 110 passes through the lens device 151 and the lens device 152 in sequence, is reflected by the dichroic portion 522, passes through the lens device 153, and is then reflected by the at least one filter area F of the filter module 130. The excitation light beam B reflected by the at least one filter area F passes through the lens device 153, the lens device 154, and the lens device 155 in sequence and is then transmitted to the wavelength conversion module 140 and converted into the converted light beam CB. The converted light beam CB is reflected by the wavelength conversion module 140 and passes through the lens device 155 and the lens device 154 in sequence. After passing through the lens device 154, the first portion CBP1 of the converted light beam CB passes through the dichroic portion 522, the lens device 153, and the at least one filter area F of the filter module 130 in sequence and is outputted from the filter module 130. In addition, the second portion CBP2 of the converted light beam CB passes through the lens device 153 and the at least one filter area F of the filter module 130 in sequence and is outputted from the filter module 130.

Figure 12:
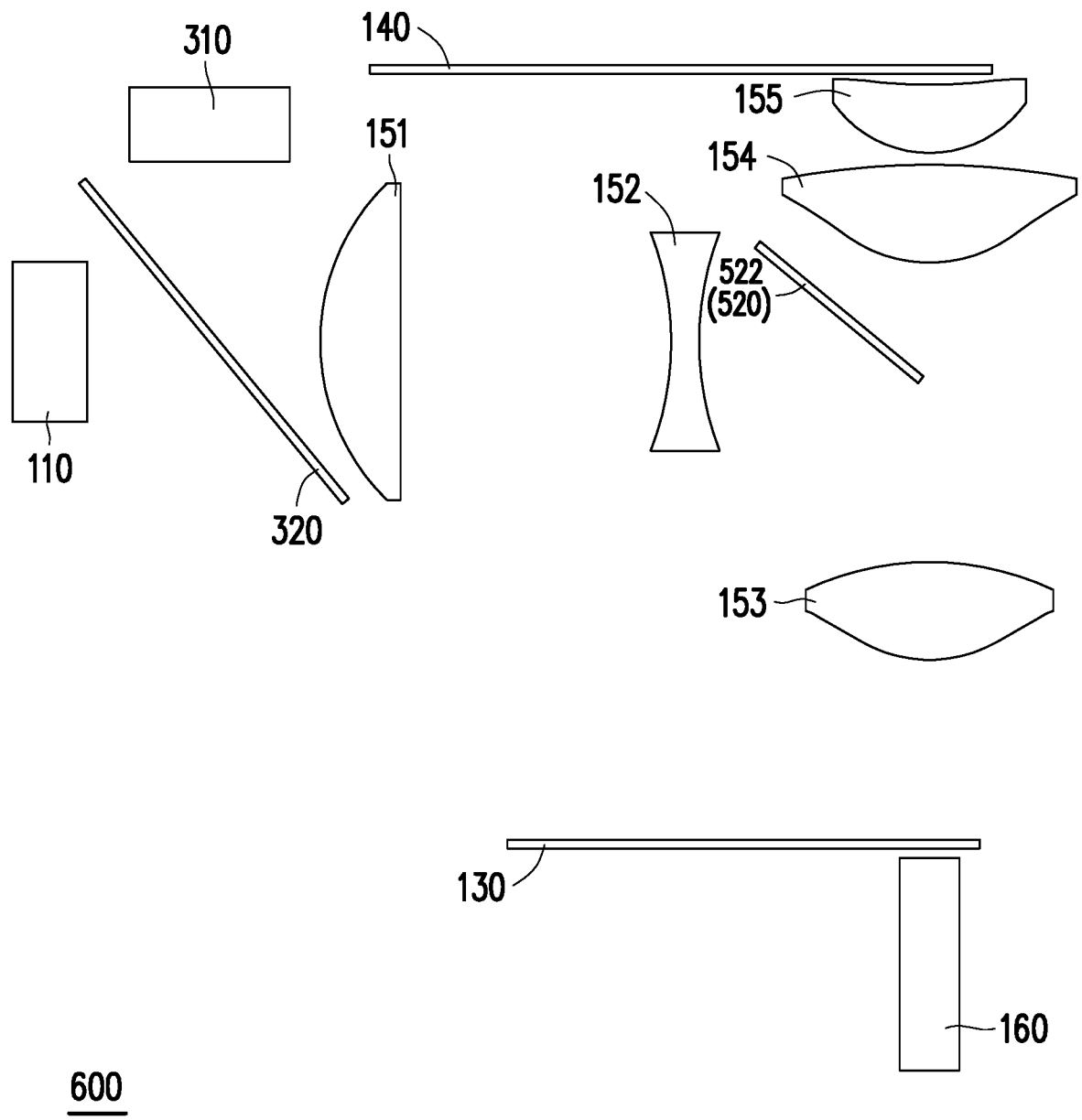
FIG. 12 is a schematic diagram of an illumination system according a sixth embodiment of the invention.
Figure 13A:
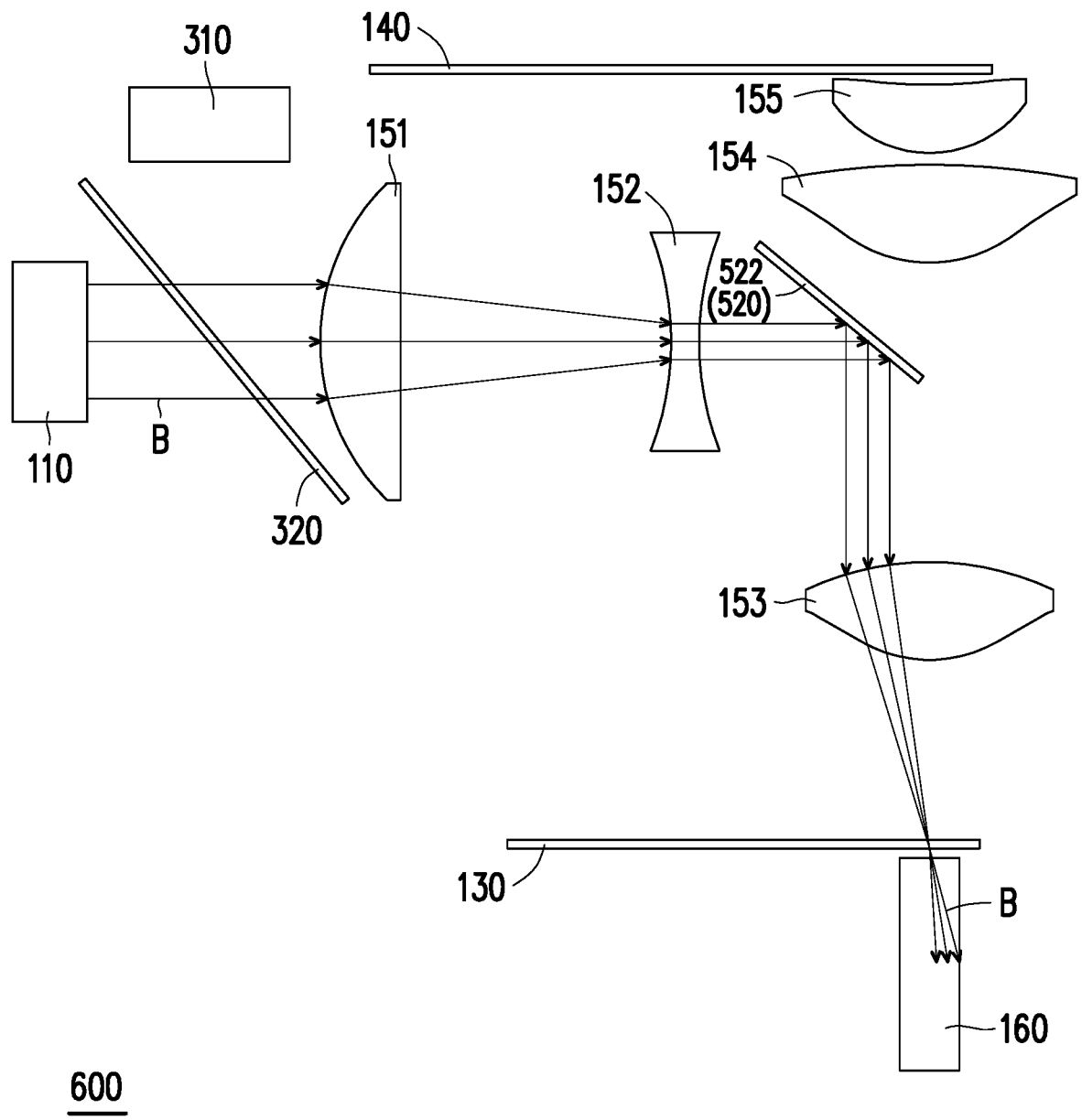
FIG. 13A to FIG. 13C are diagrams of three optical paths of the illumination system of the sixth embodiment of the invention in different time periods.
Figure 13B:
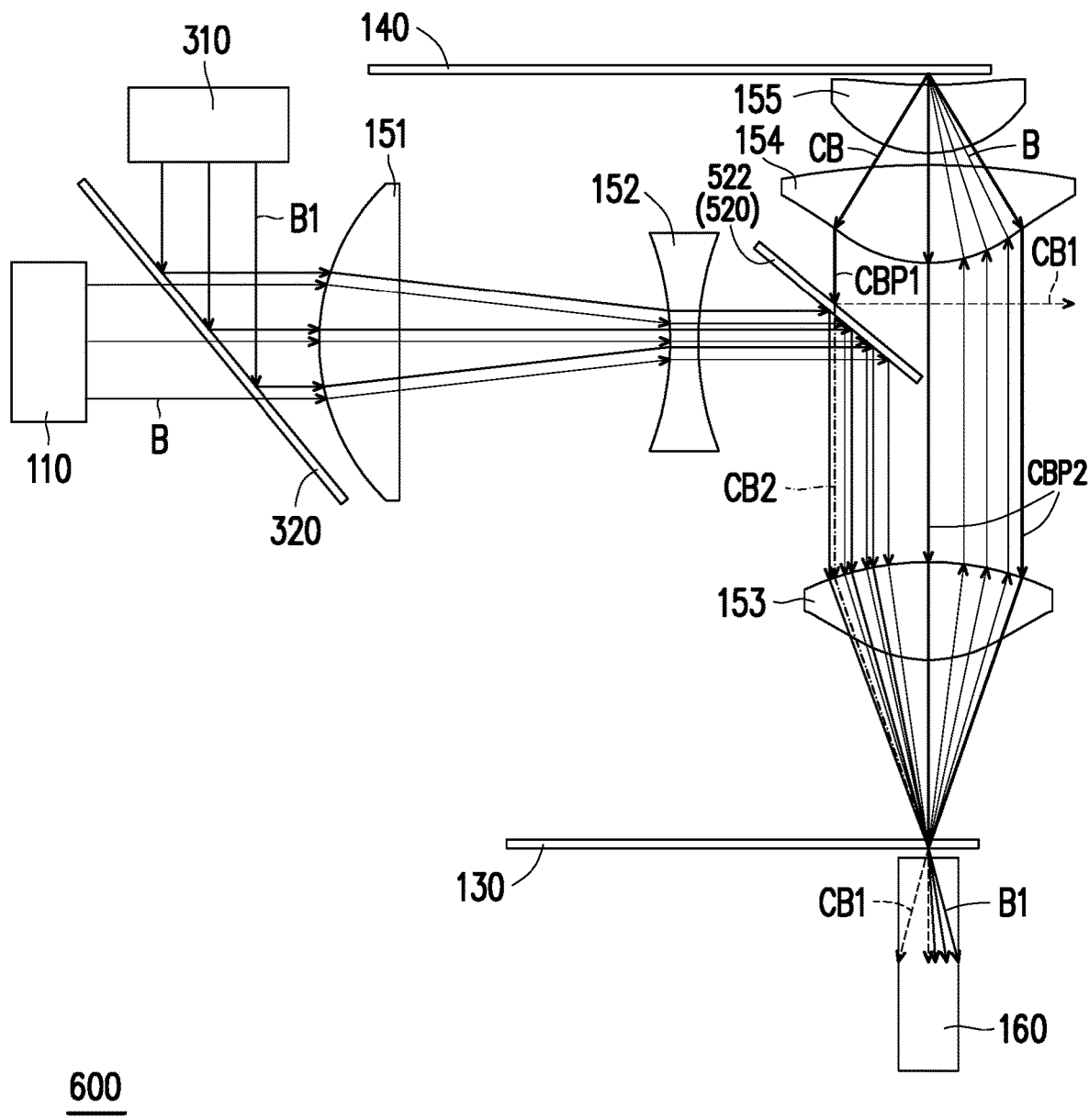
Figure 13C:
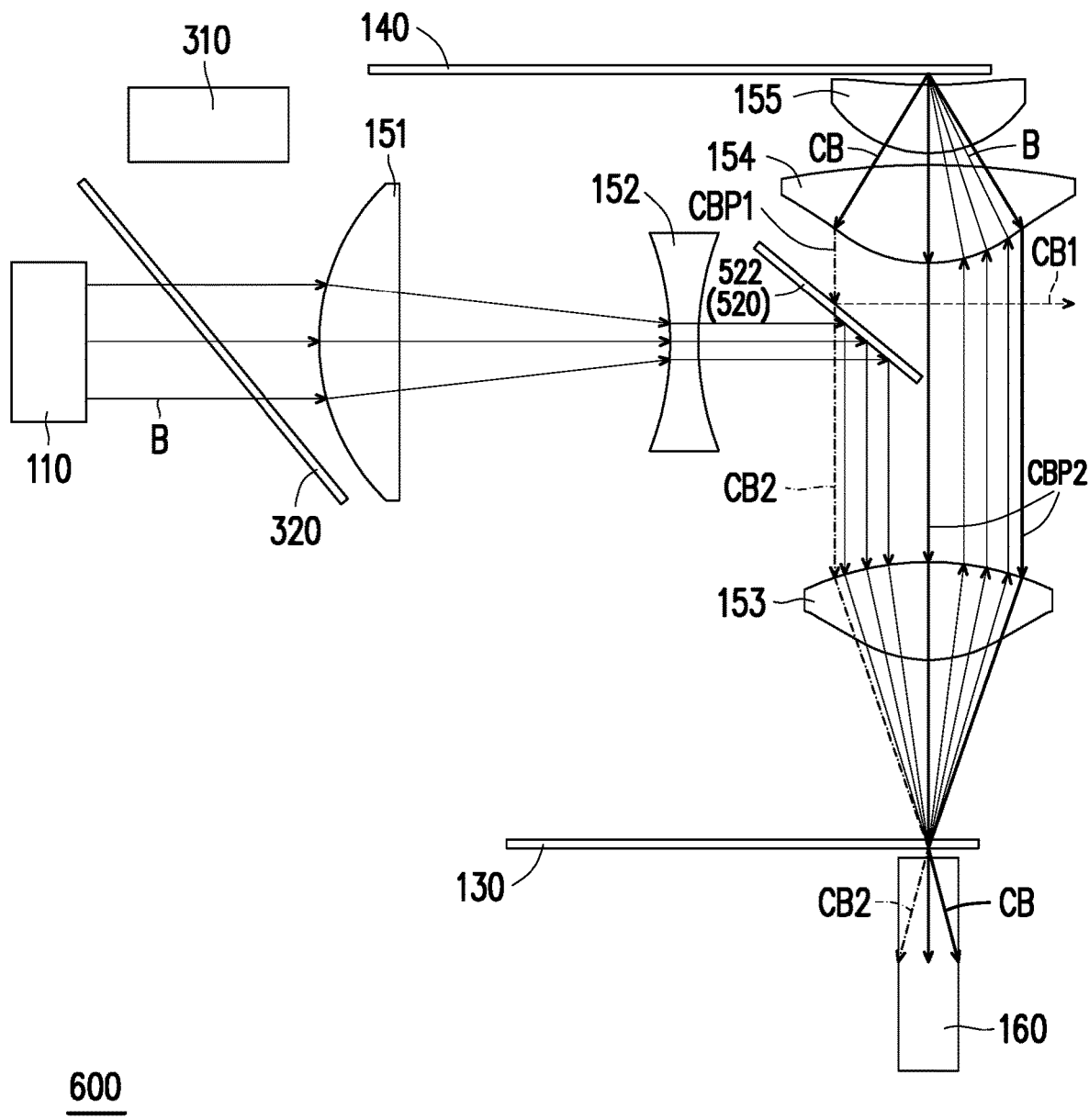

FIG. 12 is a schematic diagram of an illumination system according a sixth embodiment of the invention. FIG. 13A to FIG. 13C are diagrams of three optical paths of the illumination system of the sixth embodiment of the invention in different time periods, wherein FIG. 13A presents a transmission path of an excitation light beam in an illumination light beam outputted from the illumination system, FIG. 13B presents a transmission path of a first color light beam in the illumination light beam outputted from the illumination system, and FIG. 13C presents a transmission path of a second color light beam in the illumination light beam outputted from the illumination system. In the sixth embodiment, the filter module may include or may not include the third color filter area F3 shown in FIG. 3. Description of the third color filter area F3 has been specified above, and details thereof will not be repeated hereinafter.

With reference to FIG. 12 to FIG. 13C, an illumination system 600 is similar to the illumination system 500 of FIG. 10, wherein identical devices are denoted by the same reference numerals, and details thereof will not be repeated hereinafter. A difference between the illumination system 600 and the illumination system 500 includes the following. The illumination system 600 further includes the first color supplementary light source 310 and the dichroic device 320.

Description of the first color supplementary light source 310 and the dichroic device 320 has been specified above, and details thereof will not be repeated hereinafter. In this embodiment, the dichroic portion 522 of the light combining device 520 is also adapted to reflect the first color light beam B1 of the first color supplementary light source 310.

With reference to FIG. 13A, when the light passing-through area T of the filter module 130 (referring to FIG. 3) cuts into the transmission path of the excitation light beam B transmitted from the dichroic portion 522 of the light combining device 520, the transmission path of the excitation light beam B is identical to that shown in FIG. 11A, and thus no further description is provided herein.

With reference to FIG. 13B, when the first color filter area F1 of the filter module 130 (referring to FIG. 3) cuts into a transmission path of the first color light beam B1 transmitted from dichroic portion 522 of the light combining device 520, the first color light beam B1 emitted from the first color supplementary light source 310 passes through the lens device 151 and the lens device 152 in sequence, is reflected by the dichroic portion 522, passes through the lens device 153 and the first color filter area F1 of the filter module 130 in sequence, and is outputted from the filter module 130 after being reflected by the dichroic device 320.

When the first color filter area F1 of the filter module 130 cuts into the transmission path of the first color light beam B1 emitted from the dichroic portion 522 of the light combining device 520, the excitation light source 110 may be turned on as well. The excitation light beam B emitted from the excitation light source 110 passes through the dichroic device 320, the lens device 151, and the lens device 152 in sequence, is reflected by the dichroic portion 522, passes through the lens device 153, and then is reflected by the first color filter area F1 of the filter module 130. The reflected excitation light beam B then passes through the lens device 153, the lens device 154, and the lens device 155 in sequence and is transmitted to the wavelength conversion module 140 and converted into the converted light beam CB. The converted light beam CB is reflected by the wavelength conversion module 140 and passes through the lens device 155 and the lens device 154 in sequence. The dichroic portion 522 is disposed on the transmission path of the first portion CBP1 of the converted light beam CB reflected by the wavelength conversion module 140. Moreover, the dichroic portion 522 is disposed outside the transmission path of the second portion CBP2 of the converted light beam CB reflected by the wavelength conversion module 140. The dichroic portion 522 allows the second color light beam CB2 in the converted light beam CB to pass through and reflects the first color light beam CB1 in the converted light beam CB. The second color light beam CB2 passing through the dichroic portion 522 passes through the lens device 153 and then is transmitted to the filter module 130. The first color filter area F1 of the filter module 130 allows the first color light beam CB1 in the converted light beam CB to pass through and reflects the second color light beam CB2 in the converted light beam CB. In other words, the light beams passing through the first color filter area F1 include the first color light beam B1 emitted from the first color supplementary light source 310 and the first color light beam CB1 in the converted light beam CB. In another embodiment, when the first color filter area F1 of the filter module 130 cuts into the transmission path of the first color light beam B1 transmitted from the light combining device 120, the excitation light source 110 may be turned off as well. In this way, the light beam passing through the first color filter area F1 includes only the first color light beam B1 emitted from the first color supplementary light source 310 and does not include the first color light beam CB1 in the converted light beam CB.

With reference to FIG. 13C, when the second color filter area F2 of the filter module 130 (referring to FIG. 3) cuts into the transmission path of the excitation light beam B transmitted from the dichroic portion 522 of the light combining device 520, the first color supplementary light source 310 is turned off. The transmission paths of the excitation light beam B and the converted light beam CB are identical to that described in FIG. 13B, and thus no further description is provided herein. A difference between FIG. 13C and FIG. 13B is that in FIG. 13C, the second color filter area F2 of the filter module 130 (referring to FIG. 3) cuts into the transmission path of the excitation light beam B transmitted from the dichroic portion 522 of the light combining device 520, wherein the second color filter area F2 of the filter module 130 allows the second color light beam CB2 in the converted light beam CB to pass through and reflects the first color light beam CB1 in the converted light beam CB. In other words, the light beam passing through the second color filter area F2 is the second color light beam CB2 in the converted light beam CB.

In the foregoing embodiment, the dichroic portion 522 of the light combining device 520 reflects the excitation light beam B, the first color light beam B1, and the first color light beam CB1 in the converted light beam CB and allows the second color light beam CB2 to pass through.

In view of the foregoing, the embodiments of the invention have at least one of the following advantages or effects. In the illumination system and the projection apparatus provided by the embodiments of the invention, the light combining device is disposed on the transmission path of the excitation light beam emitted from the excitation light source, and the filter module is disposed on the transmission path of the excitation light beam transmitted from the light combining device. Accordingly, the excitation light beam emitted from the excitation light source may be transmitted to the filter module through the light combining device without being transmitted to the wavelength conversion module, and the excitation light beam transmitted to the filter module is outputted from the filter module through the light passing-through area of the filter module. Hence, in the illumination system and the projection apparatus provided by the embodiments of the invention, an opening allowing the excitation light beam to pass through is not required to be formed in the wavelength conversion module, and a plurality of light transmission devices configured for transmitting the excitation light beam passing through the opening back to the light combining device are not required to be additionally disposed either. In addition, the wavelength conversion module is not required to synchronously rotate with the filter module. That is, the light valve supporting synchronous rotation only with the filter module may be selected for the projection apparatus to reduce costs. Therefore, time for processing the electric signals can be saved in the illumination system and the projection apparatus provided by the invention, and thereby, costs are lowered and reduced volume is provided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present invention is intended to be dedicated to the public regardless of whether the element or component is explicitly recited in the following claims.

What is claimed is:

1. A projection apparatus, comprising:
an illumination system, comprising:
an excitation light source, adapted to provide an excitation light beam;
a light combining device, disposed on a transmission path of the excitation light beam emitted from the excitation light source;
a filter module, disposed on a transmission path of the excitation light beam transmitted from the light combining device, wherein the filter module comprises a light passing-through area allowing the excitation light beam to pass through and at least one filter area reflecting the excitation light beam; and
a wavelength conversion module, disposed on a transmission path of the excitation light beam reflected by the at least one filter area, wherein the excitation light beam is transmitted to the wavelength conversion module via the light combining device only after being reflected by the at least one filter area of the filter module, the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam;
a light valve, disposed on a transmission path of the illumination light beam and converting the illumination light beam into an image light beam; and
a projection lens, disposed on a transmission path of the image light beam.

2. The projection apparatus as claimed in claim 1, wherein the light combining device comprises a dichroic portion and a reflection portion, wherein the dichroic portion allows the excitation light beam to pass through and reflects the converted light beam, the reflection portion reflects the excitation light beam and the converted light beam, the dichroic portion is disposed on the transmission path of the excitation light beam emitted from the excitation light source and on a transmission path of the converted light beam reflected by the wavelength conversion module, and the reflection portion is disposed on the transmission path of the excitation light beam reflected by the at least one filter area.

3. The projection apparatus as claimed in claim 1, wherein the light combining device comprises a dichroic portion, wherein the dichroic portion reflects the excitation light beam and allows the converted light beam to pass through, the dichroic portion is disposed on the transmission path of the excitation light beam emitted from the excitation light source and on a transmission path of a first portion of the converted light beam reflected by the wavelength conversion module, and the dichroic portion is disposed outside a transmission path of a second portion of the converted light beam reflected by the wavelength conversion module.

4. The projection apparatus as claimed in claim 1, wherein rotation of the filter module is not synchronized with rotation of the wavelength conversion module.

5. A projection apparatus, comprising:
an illumination system, comprising:
an excitation light source, adapted to provide an excitation light beam;
a light combining device, disposed on a transmission path of the excitation light beam emitted from the excitation light source;
a filter module, disposed on a transmission path of the excitation light beam transmitted from the light combining device, wherein the filter module comprises a light passing-through area allowing the excitation light beam to pass through and at least one filter area reflecting the excitation light beam; and
a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam,
wherein the light combining device comprises a dichroic portion and a reflection portion, wherein the dichroic portion allows the excitation light beam to pass through and reflects the converted light beam, the reflection portion reflects the excitation light beam and the converted light beam, the dichroic portion is disposed on the transmission path of the excitation light beam emitted from the excitation light source and on a transmission path of the converted light beam reflected by the wavelength conversion module, and the reflection portion is disposed on the transmission path of the excitation light beam reflected by the at least one filter area, wherein the dichroic portion and the reflection portion are disposed on the same device, wherein the excitation light beam passing through the dichroic portion is transmitted to the wavelength conversion module through being reflected by the at least one filter area and the reflection portion in sequence, and the converted light beam reflected by the wavelength conversion module is transmitted towards the filter module through being reflected by the dichroic portion and the reflection portion;

a light valve, disposed on a transmission path of the illumination light beam and converting the illumination light beam into an image light beam; and a projection lens, disposed on a transmission path of the image light beam.

6. A projection apparatus, comprising:

an illumination system, comprising:

an excitation light source, adapted to provide an excitation light beam;

a light combining device, disposed on a transmission path of the excitation light beam emitted from the excitation light source;

a filter module, disposed on a transmission path of the excitation light beam transmitted from the light combining device, wherein the filter module comprises a light passing-through area allowing the excitation light beam to pass through and at least one filter area reflecting the excitation light beam; and a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam, wherein the light combining device comprises a dichroic portion and a reflection portion, wherein the dichroic portion allows the excitation light beam to pass through and reflects the converted light beam, the reflection portion reflects the excitation light beam, the dichroic portion is disposed on the transmission path of the excitation light beam emitted from the excitation light source and on a transmission path of the converted light beam reflected by the wavelength conversion module, and the reflection portion is disposed on the transmission path of the excitation light beam reflected by the at least one filter area, wherein the dichroic portion and the reflection portion are separated from each other, and the dichroic portion is located between the reflection portion and the wavelength conversion module, wherein the excitation light beam passing through the dichroic portion passes through the dichroic portion, is reflected by the reflection portion, passes through the dichroic portion again, and is then transmitted to the wavelength conversion module in sequence after being reflected by the at least one filter area, and the converted light beam reflected by the wavelength conversion module is transmitted towards the filter module through being reflected by the dichroic portion;

a light valve, disposed on a transmission path of the illumination light beam and converting the illumination light beam into an image light beam; and a projection lens, disposed on a transmission path of the image light beam.

7. A projection apparatus, comprising:

an illumination system, comprising:

an excitation light source, adapted to provide an excitation light beam;

a light combining device, disposed on a transmission path of the excitation light beam emitted from the excitation light source;

a filter module, disposed on a transmission path of the excitation light beam transmitted from the light combining device, wherein the filter module comprises a light passing-through area allowing the excitation light beam to pass through and at least one filter area reflecting the excitation light beam; and a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam;

a light valve, disposed on a transmission path of the illumination light beam and converting the illumination light beam into an image light beam; and a projection lens, disposed on a transmission path of the image light beam, wherein the at least one filter area comprises a first color filter area and a second color filter area, and the illumination system further comprises: a first color supplementary light source and a dichroic device, the first color supplementary light source provides a first color light beam;

the dichroic device is disposed on the transmission path of the excitation light beam emitted from the excitation light source and on a transmission path of the first color light beam emitted from the first color supplementary light source, and the excitation light beam emitted from the excitation light source and the first color light beam emitted from the first color supplementary light source are transmitted to the light combining device through the dichroic device, wherein the first color filter area cuts into a transmission path of the first color light beam transmitted from the light combining device when the first color supplementary light source provides the first color light beam, and the first color supplementary light source is turned off when the light passing-through area or the second color filter area cuts into the transmission path of the excitation light beam transmitted from the light combining device, wherein the light combining device comprises a dichroic portion and a reflection portion, the dichroic portion is disposed on transmission paths of the excitation light beam and the first color light beam transmitted from the dichroic device, the dichroic portion allows the excitation light beam and the first color light beam transmitted from the dichroic device to pass through, the first color filter area of the filter module allows at least a portion of the first color light beam to pass through and reflects light beams of remaining colors, and the reflection portion is disposed on a transmission path of the excitation light beam reflected by the first color filter area or the second color filter area and reflects the excitation light beam.

8. The projection apparatus as claimed in claim 7, wherein the dichroic portion and the reflection portion are disposed on the same device, wherein the converted light beam is reflected to the dichroic portion and the reflection portion by the wavelength conversion module, the dichroic portion allows a first color light beam in the converted light beam to pass through and reflects a second color light beam in the converted light beam, the reflection portion reflects the first color light beam and the second color light beam in the converted light beam, and the second color filter area of the filter module allows at least a portion of the second color light beam to pass through and reflects light beams of the remaining colors.

9. The projection apparatus as claimed in claim 7, wherein the dichroic portion and the reflection portion are separated from each other, and the dichroic portion is located between the reflection portion and the wavelength conversion module, wherein the excitation light beam passing through the dichroic portion passes through the dichroic portion, is reflected by the reflection portion, passes through the dichroic portion again, and is transmitted to the wavelength conversion module in sequence after being reflected by the first color filter area or the second color filter area, the converted light beam is reflected to the dichroic portion by the wavelength conversion module, the dichroic portion allows a first color light beam in the converted light beam to pass through and reflects a second color light beam in the converted light beam, and at least a portion of the first color light beam passing through the dichroic portion is reflected by the reflection portion to pass through the dichroic portion again and is transmitted towards the filter module.

10. A projection apparatus, comprising:
an illumination system, comprising:
an excitation light source, adapted to provide an excitation light beam;
a light combining device, disposed on a transmission path of the excitation light beam emitted from the excitation light source;
a filter module, disposed on a transmission path of the excitation light beam transmitted from the light combining device, wherein the filter module comprises a light passing-through area allowing the excitation light beam to pass through and at least one filter area reflecting the excitation light beam; and
a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam;
a light valve, disposed on a transmission path of the illumination light beam and converting the illumination light beam into an image light beam; and
a projection lens, disposed on a transmission path of the image light beam,
wherein the at least one filter area comprises a first color filter area and a second color filter area, and the illumination system further comprises a first color supplementary light source and a dichroic device,
the first color supplementary light source provides a first color light beam;
the dichroic device is disposed on the transmission path of the excitation light beam emitted from the excitation light source and on a transmission path of the first color light beam emitted from the first color supplementary light source, and the excitation light beam emitted from the excitation light source and the first color light beam emitted from the first color supplementary light source are transmitted to the light combining device through the dichroic device, wherein
the first color filter area cuts into a transmission path of the first color light beam transmitted from the light combining device when the first color supplementary light source provides the first color light beam, the first color supplementary light source is turned off when the light passing-through area or the second color filter area cuts into the transmission path of the excitation light beam transmitted from the light combining device, and
the light combining device comprises a dichroic portion, the dichroic portion is disposed on transmission paths of the excitation light beam and the first color light beam transmitted from the dichroic device and reflects the excitation light beam and the first color light beam transmitted from the dichroic device, the first color filter area of the filter module allows at least a portion of the first color light beam to pass through and reflects light beams of remaining colors, the dichroic portion is disposed outside a transmission path of the excitation light beam reflected by the first color filter area or the second color filter area, the wavelength conversion module is disposed on the transmission path of the excitation light beam reflected by the first color filter area or the second color filter area, the dichroic portion is disposed on a transmission path of the first portion of the converted light beam reflected by the wavelength conversion module, the dichroic portion reflects the first color light beam in the first portion and allows a second color light beam in the first portion to pass through, and the filter module is disposed on transmissions path of the second color light beam and of a second portion of the converted light beam reflected by the wavelength conversion module.

11. An illumination system, comprising:
an excitation light source, adapted to provide an excitation light beam;
a light combining device, disposed on a transmission path of the excitation light beam emitted from the excitation light source;
a filter module, disposed on a transmission path of the excitation light beam emitted from the light combining device, wherein the filter module comprises a light passing-through area allowing the excitation light beam to pass through and at least one filter area reflecting the excitation light beam; and
a wavelength conversion module, disposed on a transmission path of the excitation light beam reflected by the at least one filter area, wherein the excitation light beam is transmitted to the wavelength conversion module via the light combining device only after being reflected by the at least one filter area of the filter module, the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam.

12. The illumination system as claimed in claim 11, wherein the light combining device comprises a dichroic portion and a reflection portion, wherein the dichroic portion allows the excitation light beam to pass through and reflects the converted light beam, the reflection portion reflects the excitation light beam and the converted light beam, the dichroic portion is disposed on the transmission path of the excitation light beam emitted from the excitation light source and on a transmission path of the converted light beam reflected by the wavelength conversion module, and the reflection portion is disposed on the transmission path of the excitation light beam reflected by the at least one filter area.

13. The illumination system as claimed in claim 11, wherein the light combining device comprises a dichroic portion, wherein the dichroic portion reflects the excitation light beam and allows the converted light beam to pass through, the dichroic portion is disposed on the transmission path of the excitation light beam emitted from the excitation light source and on a transmission path of a first portion of the converted light beam reflected by the wavelength conversion module, and the dichroic portion is disposed outside a transmission path of a second portion of the converted light beam reflected by the wavelength conversion module.

14. The illumination system as claimed in claim 11, wherein rotation of the filter module is not synchronized with rotation of the wavelength conversion module.

15. An illumination system, comprising:
an excitation light source, adapted to provide an excitation light beam;
a light combining device, disposed on a transmission path of the excitation light beam emitted from the excitation light source;
a filter module, disposed on a transmission path of the excitation light beam emitted from the light combining device, wherein the filter module comprises a light passing-through area allowing the excitation light beam to pass through and at least one filter area reflecting the excitation light beam; and
a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam,
wherein the light combining device comprises a dichroic portion and a reflection portion, wherein the dichroic portion allows the excitation light beam to pass through and reflects the converted light beam, the reflection portion reflects the excitation light beam and the converted light beam, the dichroic portion is disposed on the transmission path of the excitation light beam emitted from the excitation light source and on a transmission path of the converted light beam reflected by the wavelength conversion module, and the reflection portion is disposed on the transmission path of the excitation light beam reflected by the at least one filter area,
wherein the dichroic portion and the reflection portion are disposed on the same device, wherein the excitation light beam passing through the dichroic portion is transmitted to the wavelength conversion module through being reflected by the at least one filter area and the reflection portion in sequence, and the converted light beam reflected by the wavelength conversion module is transmitted towards the filter module through being reflected by the dichroic portion and the reflection portion.

16. An illumination system, comprising:
an excitation light source, adapted to provide an excitation light beam;
a light combining device, disposed on a transmission path of the excitation light beam emitted from the excitation light source;
a filter module, disposed on a transmission path of the excitation light beam emitted from the light combining device, wherein the filter module comprises a light passing-through area allowing the excitation light beam to pass through and at least one filter area reflecting the excitation light beam; and
a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam,
wherein the light combining device comprises a dichroic portion and a reflection portion, wherein the dichroic portion allows the excitation light beam to pass through and reflects the converted light beam, the reflection portion reflects the excitation light beam, the dichroic portion is disposed on the transmission path of the excitation light beam emitted from the excitation light source and on a transmission path of the converted light beam reflected by the wavelength conversion module, and the reflection portion is disposed on the transmission path of the excitation light beam reflected by the at least one filter area,
wherein the dichroic portion and the reflection portion are separated from each other, and the dichroic portion is located between the reflection portion and the wavelength conversion module, wherein the excitation light beam passing through the dichroic portion passes through the dichroic portion, is reflected by the reflection portion, passes through the dichroic portion again, and is transmitted to the wavelength conversion module in sequence after being reflected by the at least one filter area, and the converted light beam reflected by the wavelength conversion module is transmitted towards the filter module through being reflected by the dichroic portion.

17. An illumination system, comprising:
- an excitation light source, adapted to provide an excitation light beam;
- a light combining device, disposed on a transmission path of the excitation light beam emitted from the excitation light source;
- a filter module, disposed on a transmission path of the excitation light beam emitted from the light combining device, wherein the filter module comprises a light passing-through area allowing the excitation light beam to pass through and at least one filter area reflecting the excitation light beam; and
- a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam,
- wherein the at least one filter area comprises a first color filter area and a second color filter area, the illumination system further comprises a first color supplementary light source and a dichroic device,
- the first color supplementary light source provides a first color light beam;
- the dichroic device is disposed on the transmission path of the excitation light beam emitted from the excitation light source and on a transmission path of the first color light beam emitted from the first color supplementary light source, and the excitation light beam emitted from the excitation light source and the first color light beam emitted from the first color supplementary light source are transmitted to the light combining device through the dichroic device,
- wherein the first color filter area cuts into a transmission path of the first color light beam transmitted from the light combining device when the first color supplementary light source provides the first color light beam, and the first color supplementary light source is turned off when the light passing-through area or the second color filter area cuts into the transmission path of the excitation light beam transmitted from the light combining device,
- wherein the light combining device comprises a dichroic portion and a reflection portion, the dichroic portion is disposed on transmission paths of the excitation light beam and the first color light beam transmitted from the dichroic device, the dichroic portion allows the excitation light beam and the first color light beam transmitted from the dichroic device to pass through, the first color filter area of the filter module allows at least a portion of the first color light beam to pass through and reflects light beams of remaining colors, and the reflection portion is disposed on a transmission path of the excitation light beam reflected by the first color filter area or the second color filter area and reflects the excitation light beam.

18. The illumination system as claimed in claim 17, wherein the dichroic portion and the reflection portion are disposed on the same device, wherein the converted light beam is reflected to the dichroic portion and the reflection portion by the wavelength conversion module, the dichroic portion allows a first color light beam in the converted light beam to pass through and reflects a second color light beam in the converted light beam, the reflection portion reflects the first color light beam and the second color light beam in the converted light beam, and the second color filter area of the filter module allows at least a portion of the second color light beam to pass through and reflects light beams of the remaining colors.

19. The illumination system as claimed in claim 17, wherein the dichroic portion and the reflection portion are separated from each other, and the dichroic portion is located between the reflection portion and the wavelength conversion module, wherein the excitation light beam passing through the dichroic portion passes through the dichroic portion, is reflected by the reflection portion, passes through the dichroic portion again, and is transmitted to the wavelength conversion module in sequence after being reflected by the first color filter area or the second color filter area, the converted light beam is reflected to the dichroic portion by the wavelength conversion module, the dichroic portion allows a first color light beam in the converted light beam to pass through and reflects a second color light beam in the converted light beam, and at least a portion of the first color light beam passing through the dichroic portion is reflected by the reflection portion to pass through the dichroic portion again and is transmitted towards the filter module.

20. An illumination system, comprising:
- an excitation light source, adapted to provide an excitation light beam;
- a light combining device, disposed on a transmission path of the excitation light beam emitted from the excitation light source;
- a filter module, disposed on a transmission path of the excitation light beam emitted from the light combining device, wherein the filter module comprises a light passing-through area allowing the excitation light beam to pass through and at least one filter area reflecting the excitation light beam; and
- a wavelength conversion module, disposed on a transmission path of the excitation light beam reflected by the at least one filter area, wherein the wavelength conversion module is adapted to convert the excitation light beam reflected by the at least one filter area into a converted light beam and reflect the converted light beam such that the converted light beam is transmitted towards the at least one filter area, and the excitation light beam passing through the light passing-through area and the converted light beam passing through the at least one filter area form an illumination light beam,
- wherein the at least one filter area comprises a first color filter area and a second color filter area, and the illumination system further comprises a first color supplementary light source and a dichroic device,
- the first color supplementary light source provides a first color light beam; and
- the dichroic device is disposed on the transmission path of the excitation light beam emitted from the excitation light source and on a transmission path of the first color light beam emitted from the first color supplementary light source, and the excitation light beam emitted from the excitation light source and the first color light beam emitted from the first color supplementary light source are transmitted to the light combining device through the dichroic device, wherein
- the first color filter area cuts into a transmission path of the first color light beam transmitted from the light combining device when the first color supplementary light source provides the first color light beam, the first color supplementary light source is turned off when the light passing-through area or the second color filter area cuts into the transmission path of the excitation light beam transmitted from the light combining device, and
the light combining device comprises a dichroic portion, the dichroic portion is disposed on transmission paths of the excitation light beam and the first color light beam transmitted from the dichroic device and reflects the excitation light beam and the first color light beam transmitted from the dichroic device, the first color filter area of the filter module allows at least a portion of the first color light beam to pass through and reflects light beams of remaining colors, the dichroic portion is disposed outside a transmission path of the excitation light beam reflected by the first color filter area or the second color filter area, the wavelength conversion module is disposed on the transmission path of the excitation light beam reflected by the first color filter area or the second color filter area, the dichroic portion is disposed on a transmission path of the first portion of the converted light beam reflected by the wavelength conversion module, the dichroic portion reflects the first color light beam in the first portion and allows a second color light beam in the first portion to pass through, and the filter module is disposed on transmissions path of the second color light beam and of a second portion of the converted light beam reflected by the wavelength conversion module.

* * * * *